United States Patent [19]

Bosley

[11] Patent Number: 4,585,282

[45] Date of Patent: Apr. 29, 1986

[54] MAGNETIC LEVITATION SYSTEM

[76] Inventor: Robert W. Bosley, 18104 Hoffman Ave., Cerritos, Calif. 90701

[21] Appl. No.: 515,956

[22] Filed: Jul. 19, 1983

[51] Int. Cl.⁴ ............................................. F16C 39/06
[52] U.S. Cl. ..................................... 308/10; 104/248
[58] Field of Search ................. 308/10; 104/281, 284

[56] References Cited

U.S. PATENT DOCUMENTS

| | | |
|---|---|---|
| 3,243,238 | 3/1966 | Lyman . |
| 3,512,852 | 5/1970 | North . |
| 3,791,704 | 2/1974 | Perper . |
| 3,860,300 | 1/1975 | Lyman . |
| 3,888,553 | 6/1975 | Wehde ................................. 308/10 |
| 3,927,620 | 12/1975 | Clapham . |
| 3,937,148 | 2/1976 | Simpson . |
| 4,082,376 | 4/1978 | Wehde ................................. 308/10 |
| 4,088,379 | 5/1978 | Perper . |
| 4,319,168 | 3/1982 | Kemeny . |
| 4,356,772 | 11/1982 | van der Heide . |
| 4,473,259 | 9/1984 | Goldowsky ........................ 104/284 |

FOREIGN PATENT DOCUMENTS 2825551  12/1979  Fed. Rep. of Germany ........ 308/10

*Primary Examiner*—R. Skudy
*Attorney, Agent, or Firm*—Henry M. Bissell

[57] ABSTRACT

Magnetic levitation apparatus utilizing an arrangement of permanent magnets, one or more electromagnets, position and motion sensors plus electronic circuitry to effectively support the weight of and control the position of a levitated object. Provision is made to minimize the force required from each electromagnet and the levitation system power consumption. Particular damping elements are incorporated in various arrangements of the levitation system to enhance the position and motion control of the levitated object.

92 Claims, 25 Drawing Figures

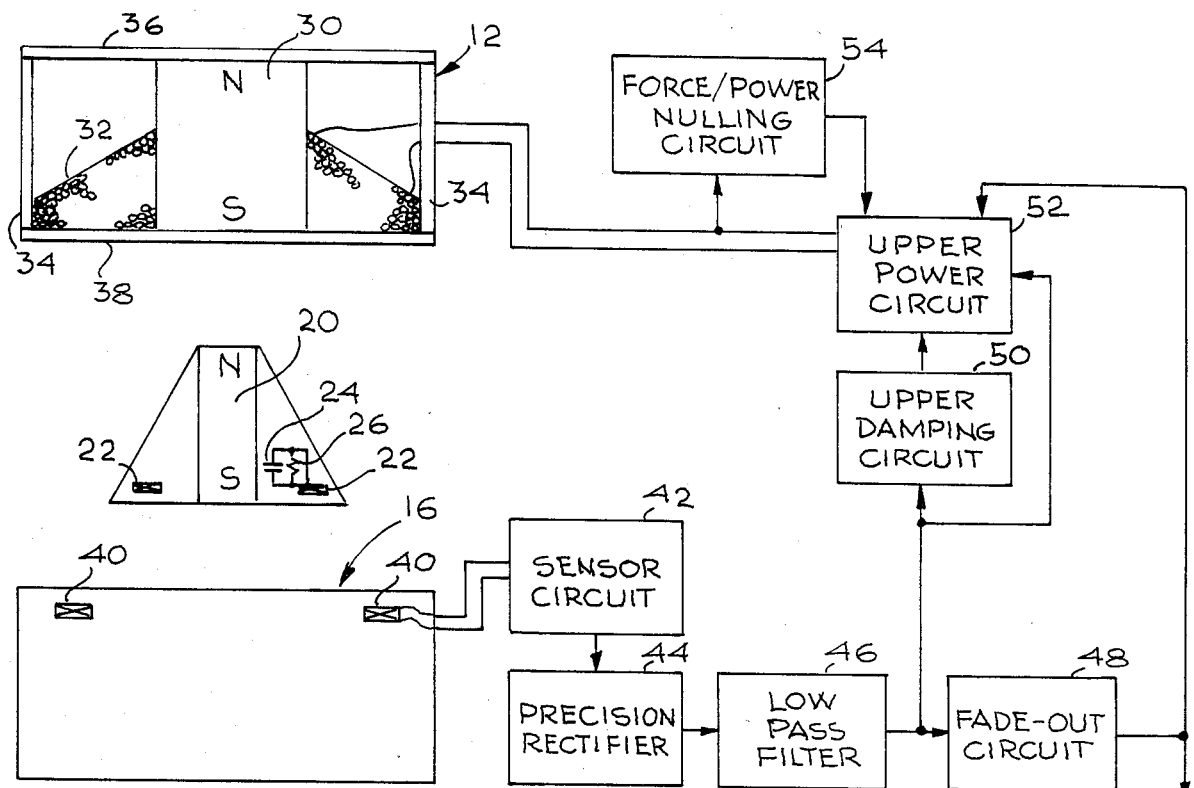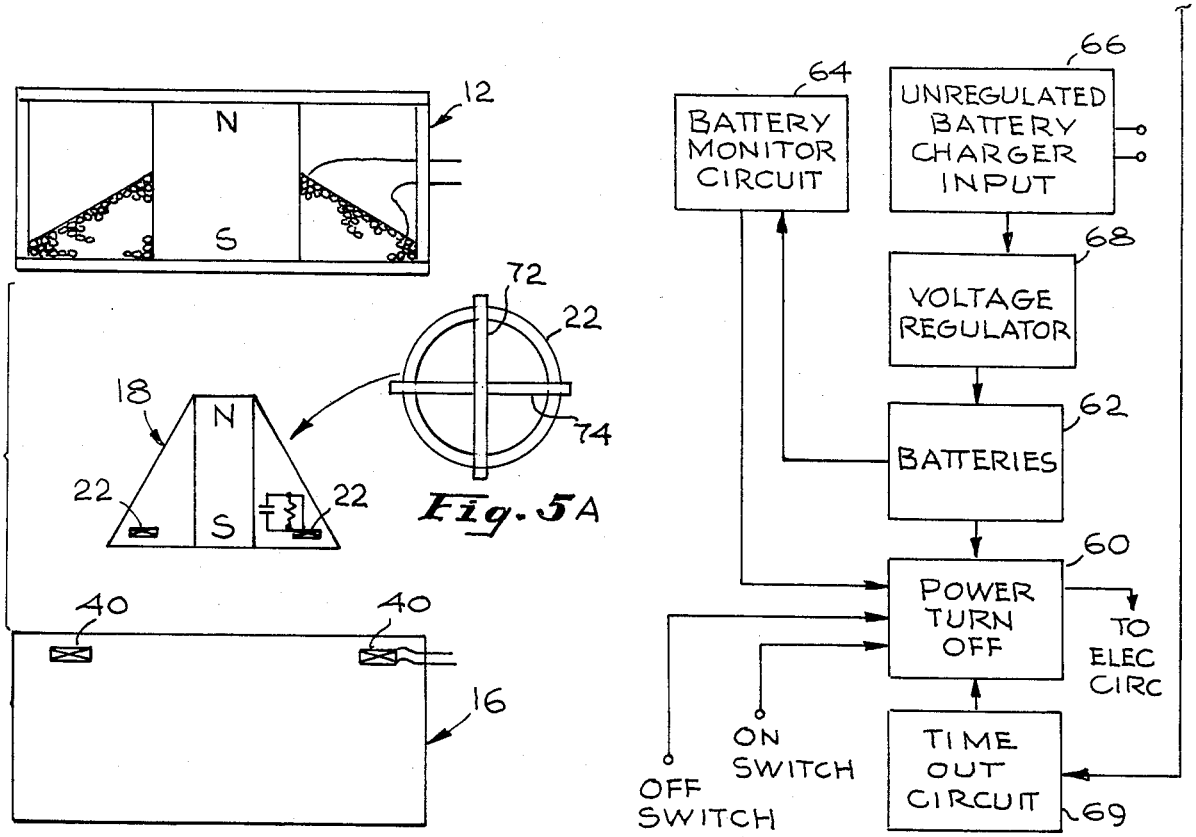

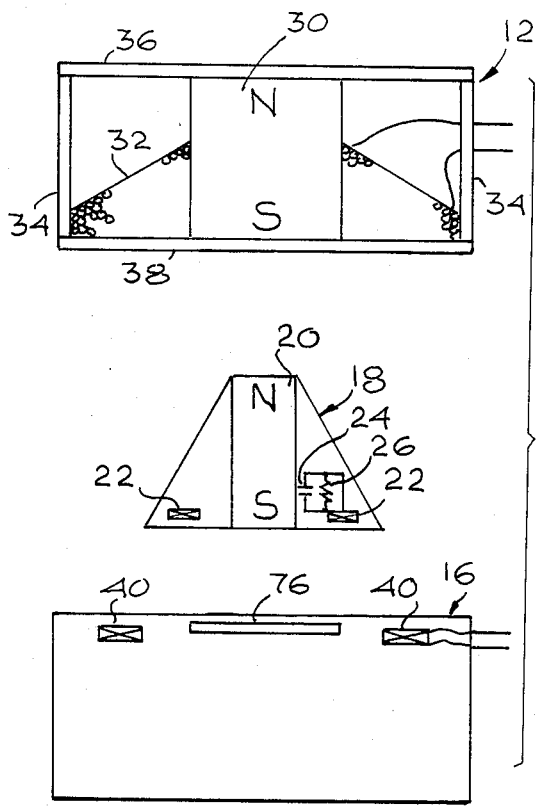
Fig. 6A
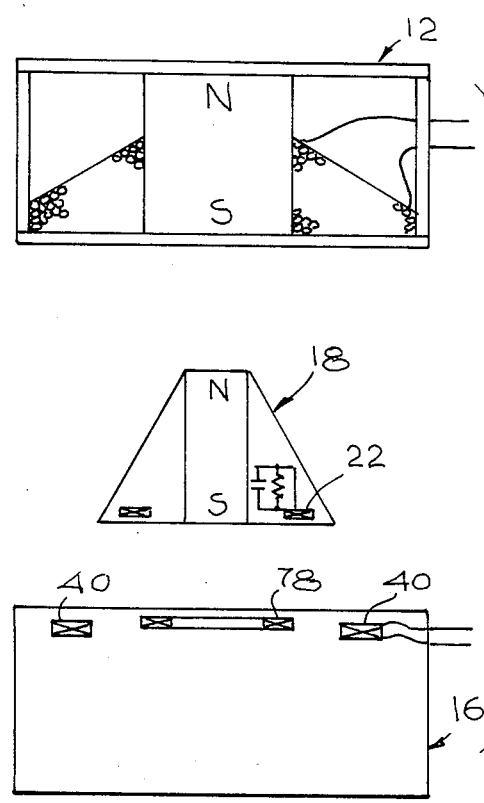
Fig. 6B
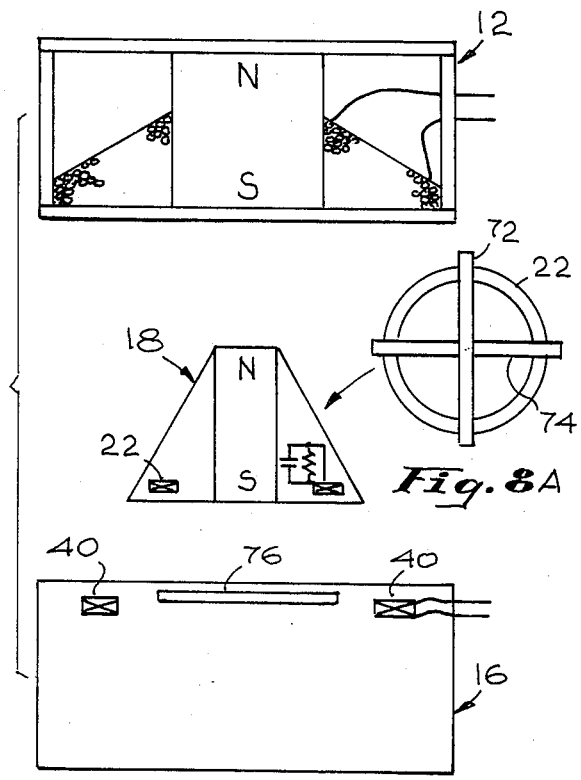
Fig. 8
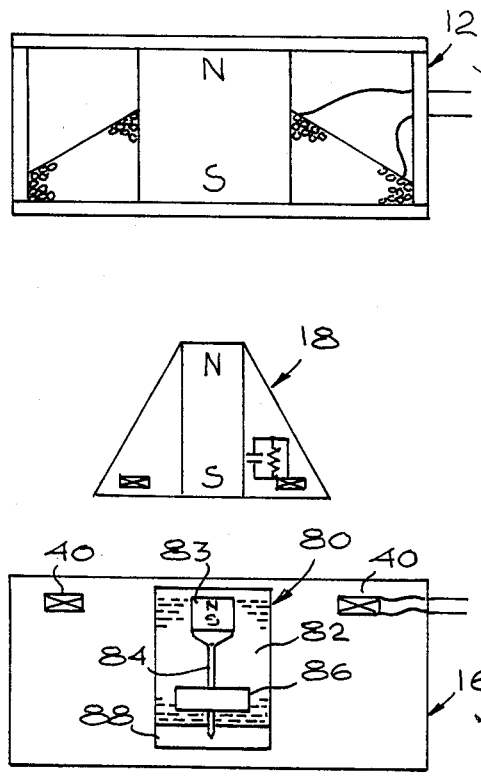
Fig. 8A
Fig. 7

MAGNETIC LEVITATION SYSTEM

BACKGROUND OF THE INVENTION

1. Field of the Invention

This invention relates to magnetic levitation devices and, more particularly, to such devices in formats that utilize an axially-symetrical divergent magnetic field to produce a lifting force that supports the weight of a magnetically responsive levitated object. Such lifting forces can be generated by the attraction of two magnetic elements or by the repulsion of two magnetic elements. Some of the versions of this invention described herein pertain to attraction type levitation systems while others pertain to repulsion type levitation systems. Certain features of this invention, especially subsystems for radial damping, are applicable to levitation systems for both types.

2. Description of the Prior Art

Magnetic levitation of an object may be used as a novelty to stimulate intellectual curiosity, to isolate a levitated object from structurally coupled vibrations, or to eliminate the necessity for support bearings in rotating machinery (thus permitting higher speeds and eliminating bearing drag), to name a few examples.

Magnetic levitation of an object in a gravitational field is possible only if a magnetically generated lifting force is applied to that object to precisely counteract the force of gravity on the object. Additional forces must be applied to the levitated object to oppose any deviation in its position from the stable levitation point in space. Forces must also be applied to oppose any velocity of motion away from the stable levitation point.

There are two basic types of levitation systems: (1) those based on the axial attraction force between two magnetic elements, and (2) those based on the axial repulsion force between two magnetic elements.

In attraction type levitation systems, a stationary magnetic field generating element is positioned above a levitated member. The levitated member contains a magnetic field responsive element. There exists an attraction force between the stationary magnetic field and the levitated member. To assure long term axial position stability of the levitated member, the axial component of this attraction force must decrease with any increase in the height of the levitated member. To assure long term translational position stability of the levitated member, the horizontal components of this attraction force must oppose any errors in the translational position of the levitated member.

In attraction type levitation systems, the stationary magnetic field cannot be generated solely by a passive system of permanent magnets since permanent magnets cannot generate the magnetic field gradients required to assure decreasing lift force with increasing height. If permanent magnets were used to generate the stationary magnetic field, the levitated member would experience vertical overcenter position failure. The axial spring rate between the stationary and levitated magnetic elements would be negative so the lift force would increase with the height of the levitated member. If the magnetic lift force exceeded the weight of the levitated member even slightly, the levitated member's position would snap upward. If the magnetic lift force were even slightly less the the levitated weight, the levitated member would fall. This vertical instability can be prevented by replacing or augmenting the permanent magnet in a stationary magnetic field generating element with an electromagnet and by using an active servo control system to vary the stationary magnetic field strength as a function of the height of the levitated member. Attraction type levitation systems can be inherently stable for the long term translational position of the levitated member without the need for any active horizontal servo control system.

In an attraction type magnetic levitation system, wherein a levitated member is suspended in a gravitational field free from any visible means of support, a variable magnetic field must be generated by a stationary element and the levitated member must contain a magnetic field responsive element. The stationary magnetic field can be produced by an electromagnet or a combination of a permanent magnet and an electromagnet. (Using a permanent magnet in addition to an electromagnet has the advantage of reducing the power consumption of the electromagnet.) The magnetic field responsive element can be either a permanent magnet or a ferromagnetic material (either being capable of producing a lift force that varies with the strength of the stationary magnetic field). Using a permanent magnet rather than a ferromagnetic material has the advantage of minimizing the magnetic field strength required from the stationary field generating element and allows increased spacing between the stationary and levitated magnetic elements.

In repulsion type levitation systems, a stationary magnetic field generating element is positioned below a levitated member. The levitated member contains a magnetic field responsive element including a permanent magnet. There exists a repulsion force between the stationary magnetic field and the levitated member. To assure long term axial position stability of the levitated member, the axial component of this repulsion force must decrease with any increase in the height of the levitated member. To assure long term translational postion stability of the levitated member, the translational component of this repulsion force must oppose any errors of translational postion. In repulsion type levitation systems, the stationary magnetic field cannot be generated solely by a passive system of permanent magnets, since permanent magnets cannot generate the magnetic field gradients required to assure the generation of forces that oppose any errors in translational position. If permanent magnets were used to generate the stationary magnetic field, the levitated member would experience horizontal overcenter position failure. The translational spring rate between the stationary and levitated magnetic elements would be negative. Therefore, there would be translational forces directed away from the stable levitation point in space if there were any translational position errors, and these forces would increase with the magnitude of the position errors. This horizontal instability can be prevented by augmenting the vertical force generating permanent magnet in the stationary magnetic field generating element with a horizontal force generating electromagnet and by using an active servo control system to intentionally distort the horizontal symmetry of the stationary magnetic field as a function of the translational position error of the levitated member. Repulsion type levitation systems are inherently stable in the long term axial position of the levitated member without the need for an active axial position servo system.

In a repulsion type magnetic levitation system, wherein a levitated member is suspended in a gravitational field free from any visible means of support, a magnetic field with controllable axial nonsymmetry must be generated by a stationary element and the levitated member must contain a magnetic field responsive element. The stationary magnetic field can be produced by an electromagnet array or a combination of a permanent magnet and an electromagnet array. The magnetic field responsive element must be a permanent magnet or a permanent magnet array.

Since in all practical systems of the attraction type for generating the supporting magnetic field, the gradient of the magnetic field is far greater than the gradient of the gravitational field, in a static support system there is only one position at which the magnetic levitating force precisely counterbalances the gravitational force so that the net force on the levitated object is zero. In a practical system, however, it is impossible to develop the desired levitation at the zero net force position, since the slightest perturbation will shift the levitated object from that position and then the object will follow the force gradient in the direction of net applied force.

A practical magnetic force levitation system therefore requires a dynamic system with some sort of servomechanism feedback which is capable of adjusting the magnetic force field with a response which is quicker than the actual motion of the levitated object in response to the net force field. Such a dynamic levitation system can be achieved fairly readily by the use of one or more electromagnetic field coils to develop the magnetic levitating field and a sensor positioned to monitor the actual position of the levitated member and coupled to control the level of current applied to the electromagnetic field generating elements with sufficient speed to compensate for any perturbations or minor changes in the instantaneous position of the levitated member.

Magnetic levitation systems of this type are disclosed in U.S. Pat. Nos. 3,512,852 of North and 3,243,238 of Lyman.

In levitation systems of the type thus far described, substantial power is required to develop the electromagnetic field. Of substantial interest, therefore, is the development of arrangements, generally including combinations of permanent magnets together with the electromagnetic field generating apparatus, which do not depend on the continuous application of the electromagnetic field to support the levitated object.

The power consumption required for establishing magnetic levitation can be substantially reduced by the inclusion of suitable combinations of permanent magnets in the levitation system. The only power required in such systems is that which is needed to restore a position of balance between the permanent magnet force and the force of gravity. Arrangements of this type are disclosed in U.S. Pat. Nos. 3,860,300 of Lyman, 3,937,148 of Simpson and 4,088,379 of Perper. Another patent of Perper, U.S. Pat. No. 3,791,704, discloses apparatus for trimming the magnetic suspension system by mechanically moving adjustable permanent magnets or by varying the field of adjustable permanent magnets using at least one magnetizing winding.

The use of magnetic suspension for the rotor of a centrifuge is disclosed in an article by J. W. Beams entitled "Magnetic-Suspension Ultracentrifuge Circuits", ELECTRONICS, March, 1954, pp. 152-155. The article describes rotation in a vacuum at 20,000 revolutions per second and discusses damping arrangements including the use of a dashpot and magnetic element combination for horizontal damping of the rotor.

SUMMARY OF THE INVENTION

In brief, arrangements in accordance with the present invention comprise a magnetic levitation system in a configuration suitable for demonstration of the principles here involved. It should be understood that the principles of operation of embodiments of the present invention may have application in many different structural configurations, such as in the field of rotating machinery, for example. The disclosure of the present invention in the context of a pyramid shape as the levitated member is not to be taken as limiting the scope of utilization of the principles of the present invention in any way.

In keeping with the exemplary utilization, which is a levitation system of the attraction type, the apparatus embodying the invention is in the form of a rectangular parallelepiped having an upper box and a lower box joined by three legs extending across a space between the two boxes. The legs serve to support the upper box and also conceal the electrical wires leading between the boxes. The levitated element is in the form of a truncated pyramid and is positioned for levitation within the defined space between the two boxes. The pyramid shape is adopted for both esthetic and functional reasons. The pyramid contains a magnetic element of elongated cylindrical form extending substantially the height of the truncated pyramid. Near the base of the pyramid, surrounding the magnetic element and having a diameter substantially greater than the diameter of the magnetic element, is a target coil in the form of an electrical coil comprised of a few turns of fine wire and connected in closed series circuit with a parallel combination of a capacitor and resistor for tuning the coil.

The upper box also contains a magnetic element of elongated cylindrical form with a force coil having a substantial number of turns surrounding the magnetic element. This coil has external connections to an electrical driving circuit. Either or both of the magnetic elements of the pyramid and the upper box may be a permanent magnet. If only one of the elements is a permanent magnet, the other is constructed of a ferrous material; however, I prefer that both of the magnetic elements be permanent magnets with opposite magnetic poles facing each other.

The lower box contains at least a sensing coil of relatively few turns arranged in a generally horizontal configuration with a mean diameter slightly exceeding the mean diameter of the target coil in the pyramid for interacting with the pyramid coil. The sensing coil in the lower box is connected in a tuned oscillator circuit which, through the interaction with the target coil, senses the position and movement of the pyramid and, through suitable rectifying, filtering and damping circuitry, applies a signal to the drive circuit for the force coil in the upper box to compensate for the sensed deviation of the pyramid from a null position, which null position is defined as the position at which the pyramid is supported purely by the balancing of the permanent magnet field opposing the gravitational field. This null position may change if, for example, the weight of the pyramid is changed or if the permanent magnet field or gravitational field is not constant.

The pyramid, for proper support as a levitated element, must be stabilized against movement in a number of modes, the principal ones of which are defined as follows: Mode 1 refers to vertical or axial motion, up or down from the null position; Mode 2 is principally translational motion from side to side relative to the null position, although it includes an element of pivoting of the pyramid as the pyramid deviates transversely from the null position; Mode 3 is prinicipally a tilting mode from some center of pivoting within the pyramid. Each of these modes involves oscillation relative to the null position, which oscillation is damped under the influence of the control circuitry. For particular embodiments of the invention which have been constructed, the oscillation in Mode 1 has a natural resonant frequency of approximately 1.5 Hz, the oscillation in Mode 2 is resonant at approximately 1 Hz, and the oscillation in Mode 3 is resonant at approximately 5 Hz. None of these modes is concerned with rotation of the levitated object about its alignment axis, which normally does not affect stabilization of the object unless the object exhibits some inherent imbalance relative to its axis of rotation.

The upper box is substantially encased with metal plates for shielding. The four sides of the box and the top are formed of iron sheets; the bottom of the box may comprise an aluminum sheet or it may be unshielded, comprising a sheet of plastic or the like. The electrical connections to the coil in the upper box extend downward to the circuitry in the lower box, being concealed in one of the legs supporting the upper box. The power supply and all electrical circuitry are contained within the lower box. The main power supply is a battery unit so that the system may be operated without any apparent connection to an electrical source. However, provision is made for connecting a self-contained battery charger to an electrical outlet for recharging the battery. The circuitry in the base also includes strategically positioned, magnetically responsive reed switches which can be controlled to enhance certain aspects of mystique associated with the model of the invention.

Various arrangements in accordance with the present invention comprise combinations of circuitry including filters and damping elements to achieve varying degrees of control of the modes of oscillation of the levitated pyramid. One or another of these various arrangements may be selected for the control function, depending upon how tightly the oscillation of a particular mode is desired to be controlled.

In general, circuitry for controlling the depicted embodiment of the present invention includes an amplitude control circuit coupled to drive the sensing, or excitation, coil. This circuit includes provision for adjusting the amplitude control in setting up the levitation system. This circuit drives the sensing coil and senses the degree of loading imposed upon the circuit by the coupling with the target coil in the base of the pyramid, and develops corresponding position and velocity signals related to the pyramid motion. The output of the amplitude control circuit is coupled to a precision rectifier, after which it is fed through a low pass filter to a damping circuit, thence to a power circuit coupled to drive the force coil in the upper b0x. A feedback circuit from the force coil to the drive circuit is also provided to develop zero power consumption when the pyramid position is stable.

A first alternative arrangement of the present invention includes two additional target coils installed in the pyramid. These are mounted in orthogonal vertical planes and permit sensing of pitch and yaw of the pyramid separately from the signals developed by the axial coil in the horizontal plane at the base of the pyramid alone. While these additional pitch and yaw coils provide marginal damping of the Mode 2 and 3 oscillations, they eliminate the excitation of those modes which is encountered in the single coil system.

A variant of the first arrangement includes the addition of a passive eddy current element in the bottom box, centered within the sensing coil. This element may be a copper ring or copper plate and effects a shaping of the field coupling the sensing coil and the pyramid coil with resultant damping of oscillation in both Modes 2 and 3. The beneficial effect of this modification diminishes with increased spacing between the pyramid and the lower box.

In another arrangement in accordance with the present invention, a viscous magnetic damper is installed in the lower box, generally centered within the circle of the sensing coil. This may include a small magnet mounted within a viscous liquid to follow the motion of the pyramid. The natural frequency of the damper is tuned to the oscillations of Modes 2 and 3, and it serves to develop effective viscous damping of transverse and tilting pyramid motion. As before, this is more effective if the gap between the pyramid and the lower box is small.

In another alternative arrangement, an auxiliary force coil is mounted about the cylinder containing the viscous damper and connected to be driven by damping and power signals derived from the aforementioned low pass filter. An additional force coil is also mounted in the upper box. In this arrangement, the upper coil is used only for static positioning. A phase lag in the control current is developed to specifically counteract manual perturbations of the pyramid, as when the pyramid is touched, pushed or otherwise manually disturbed.

In still another arrangement in accordance with the invention, the force coil for the upper box and its associated circuitry is eliminated, the support being effected from the force coil in the lower box and its associated drive circuitry in a levitation system of the repulsion type. This is effective to provide static support and damping control for all oscillation modes. It may be utilized with or without the viscous damper, which is optional. Since both coils are now in the lower box, pains should be taken to avoid unintended interaction between the fields of the force coil and the excitation/sense coil.

Various alternative arrangements in accordance with the invention incorporate both axial and radial sensing coil arrays and axial and radial force coil arrays mounted in the lower box below the levitated member. These arrays generally take the form of quadrature coil segments. The quadrature segments of the sense coils may be connected generally in the form of two figure 8s, rotated 90° with respect to each other. The use of double figure 8 coils for sensing pyramid position is extremely effective for all three modes of oscillation and permits damping in the three coordinate axes. When the pyramid is centered above the axes of the two figure 8 coils, the voltages generated in the two halves of each figure 8 oppose each other and cancel out. If there is a shift of the pyramid to one side of the axis, this is detected by unequal bucking of the induced voltages and the direction is determined by the phase of the detected signal. In another arrangement, an additional circumferential excitation coil is provided which works in conjunction with the double figure 8 configuration of the sensing coil array.

In still other arrangements, various combinations of permanent magnets are provided for the support magnet as well as the magnet in the levitated member. In one variation, the support magnet is located below the levitated member in a repulsion type of levitation system.

DESCRIPTION OF THE DRAWINGS

A better understanding of the present invention may be had from a consideration of the following detailed description, taken in conjunction with the accompanying drawings in which:

FIG. 3 is a combination block and schematic diagram illustrating a portion of one particular arrangement in accordance with the present invention;

FIG. 4 is a block diagram of another portion of the circuitry utilized in arrangements of the present invention;

FIGS. 5 and 5A are schematic representations illustrating a variant of the arrangement of FIG. 3;

FIGS. 6A and 6B represent still other variations of the arrangement of FIG. 3;

FIG. 7 is a block diagram representing another embodiment of the invention;

FIGS. 8 and 8A represent still another alternative arrangement in accordance with the invention;

DESCRIPTION OF THE PREFERRED EMBODIMENTS

Figure 1:
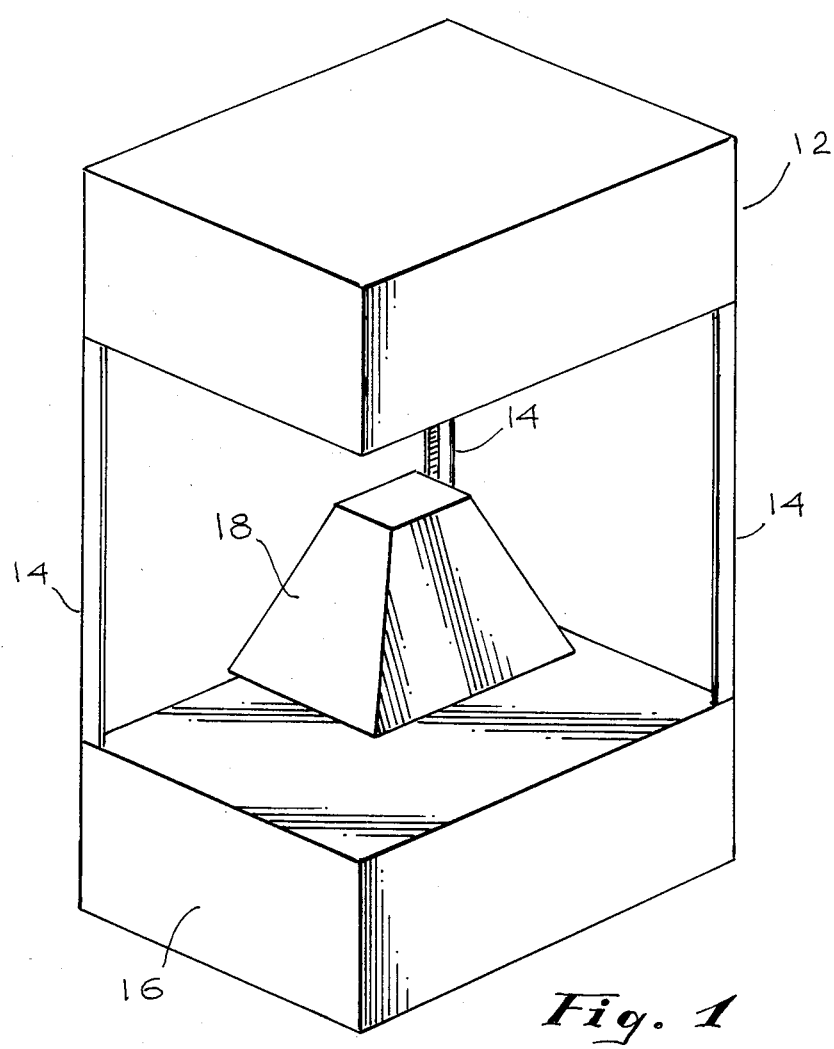
FIG. 1 is a perspective view of one particular levitation apparatus of the present invention.

FIG. 1 illustrates an embodiment of the present invention in a particular form of levitation apparatus 10. This is shown comprising an upper box 12 supported on three legs 14 above a lower box or base 16. A space is defined between the upper and lower box within which a truncated pyramid 18 is positioned for levitation without visible support when the circuitry of the apparatus 10 is operative. The fourth leg is omitted from the corner of the support structure appearing in the foreground of FIG. 1 for esthetic reasons and to facilitate access to the pyramid, although the dimensions of the pyramid are such that it may be removed from the space between the boxes between the legs on the two rearward sides.

In this embodiment, which is a levitation system of the attraction type, levitation of the pyramid 18 is achieved by the use of a pair of permanent magnets, one in the upper box 12 and one in the pyramid 18, to develop a magnetic field which exactly counterbalances the force of gravity in a given null position of the pyramid. This permanent magnet field is varied as necessary, within appropriate ranges of operation, by one or more associated electromagnetic force coils energized in accordance with signals developed by sensing coils and associated circuitry which monitor the movement of the pyramid. For example, if a coin is placed on the levitated pyramid 18 of FIG. 1, the additional weight tends to drive the pyramid downward from its initial null position. However, the new null position for the pyramid with the additional weight is above the initial null position because a stronger permanent magnet field at the null position is now required to support the additional weight. A new null position is established by the electrical circuitry and the force coil. When the pyramid is in its null position, it can be supported entirely by the permanent magnet field so that no power need be supplied to the force coil to support the pyramid, its only purpose being to adjust the pyramid to compensate for movements from the null position.

Figure 2:
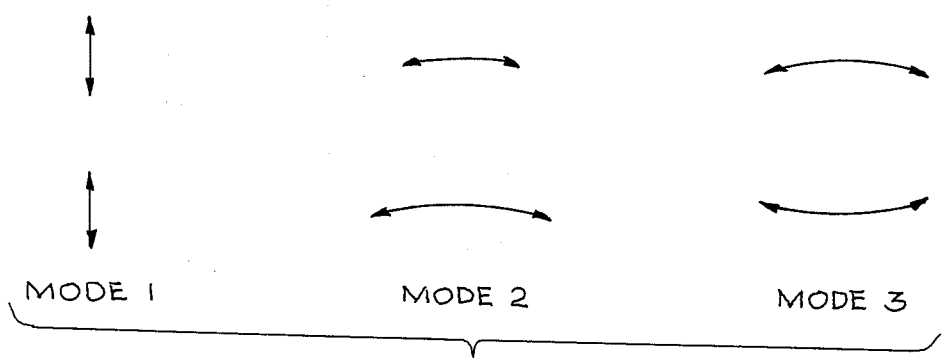
FIG. 2 is a diagram illustrating the modes of oscillation defining the movement of the levitated object of FIG. 1 in the magnetic field.

Pyramid motion can be analyzed in terms of three modes of oscillation. These are represented by the respective pairs of arrows in FIG. 2, which show a purely translational (axial) movement in the vertical direction (Mode 1), a largely translational (radial) movement in the horizontal direction with some pivoting of the pyramid (Mode 2) and a pure rotational motion of the pyramid (Mode 3). In the diagrams of FIG. 2, the upper and lower arrows for each mode represent the movement of points on the upper and lower surfaces of the pyramid, respectively. It will be understood that these movements may occur, as represented, with respect to any vertical plane through the center of the pyramid.

FIG. 3 illustrates one particular circuit arrangement in accordance with the present invention. This shows the pyramid 18 being levitated between the upper box 12 and the lower box 16. Although shown outside the lower box 16, it will be understood that all of the circuitry shown in FIG. 3 and in the figures to follow which is not enclosed within the upper box 12 and the pyramid 18 is installed within the lower box 16.

As shown in FIG. 3, the pyramid encloses a permanent magnet 20 which is centered in the pyramid and extends between the top and bottom faces. The magnet is surrounded by an electrically conducting target coil 22, the windings of which are connected in series circuit with a parallel combination of a capacitor 24 and resistor 26 which are provided for partial tuning of the coil 22 to develop a Q of about 10.

The upper box 12 also contains a concentrically positioned permanent magnet 30 surrounded by force coil 32 containing a substantial number of turns. The two magnets 20, 30 are aligned so that opposite poles face each other for attraction. The sides 34 and top 36 of the upper box are formed of iron sheets for shielding. The bottom 38 of the upper box 12 is a sheet of aluminum alloy.

The lower box 16 is shown containing, near its upper surface, a concentric sense or excitation coil 40 which is powered by an oscillator in the sensor circuit 42 to induce current in the target coil 22 of the pyramid. The interaction between the coils 22, 40 varies, depending upon the spacing and attitude of the respective coils, and this variation in interaction is sensed in the sensor circuit 42. The output of the sensor circuit 42 is coupled to a precision rectifier 44 and thence to a low pass filter 46 which provides an output to a fade-out circuit 48, an upper damping circuit 50 and an upper power circuit 52 which is coupled to the output of the damping circuit 50. The output of the fade-out circuit 48 is also applied to the upper power circuit 52 and to a time-out circuit, shown in associated FIG. 4. The upper power circuit 52 controls current in the force coil 32 of the upper box, thus developing a variation in the overall magnetic field to compensate for any departure of the pyramid from the true null position. A nulling circuit 54 is connected to the output of the power circuit 52 and develops a feedback signal to zero the current to the coil 32 when the pyramid is detected in the null position.

The arrangement of the invention shown in FIG. 3 is effective to levitate the pyramid, but the pyramid tends to oscillate in Modes 2 and 3 because phase shifts in the damping servo system tend to excite instead of damp these modes of oscillation. The first mode of oscillation (vertical motion) is critically damped.

Figure 17:
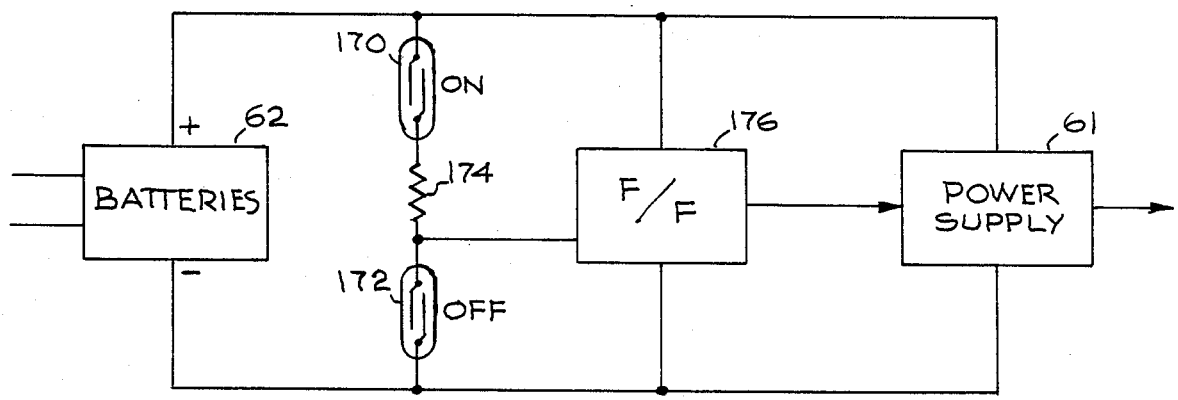
FIG. 17 is a block diagram illustrating a particular feature of the power supply utilized in circuitry of the present invention.

FIG. 4 principally represents the power supply circuitry for arrangements of the present invention. It is shown comprising a power turn off stage 60 which controls the supply of power to the electrical circuitry such as is shown in FIG. 3. A battery power supply 62 provides output to the turn off stage 60 and a battery monitor circuit 64 is also connected between the batteries 62 and the power turn off stage 60 to cause the power to be turned off when the batteries approach discharge. A self-contained battery charger 66 is provided for connection to external electrical circuitry, the output of which is applied to the batteries 62 through a voltage regulator 68. The power turn off stage receives additional input control signals from associated on and off switches, such as are shown in FIG. 17. Finally, the stage 60 also receives a signal from a time-out circuit 69, the purpose of which is to cause the stage 60 to turn off all electrical power in the absence of sensing signals being received from the fade-out circuitry of FIG. 3 for a predetermined period of time, as would be the case if the pyramid were removed from the levitation apparatus without turning off the power.

FIGS. 5 and 5A show an arrangement of the pyramid for use with the circuitry of FIG. 3, except that the pyramid in this case is provided with three closed circuit, tuned target coils, rather than one. as indicated in FIG. 5A, which is a plan view of the pyramid coils, additional target coils 72 and 74 are provided in vertical planes at right angles to each other. Coils 72 and 74 permit detection of yaw and pitch motion, respectively, more effectively than is possible with the single coil 22. With this system, oscillations in Mode 1 are critically damped. Those in Modes 2 and 3 are marginally damped, but such motion is not excited by the associated servo system, as was the case in the arrangement of FIG. 3.

FIGS. 6A and 6B illustrate an arrangement similar to that in FIG. 3 but with the addition of an eddy current damping element located concentrically of the sensing coil 40 near the upper surface of the lower box 16. This element preferably comprises a copper plate 76, as shown in FIG. 6A, although it may be a closed copper ring 78 as shown in FIG. 6B. The effect of the eddy current element is to distort and shape the field coupling the coils 22, 40 to improve the detection of pyramid movement in Modes 2 and 3. This enhanced sensing of pyramid motion is more effective where the axial spacing between the pyramid and the eddy current damping element is small. The eddy current element decreases flux density in the center of the transmitting coil 40. Thus a side motion of the bottom of pyramid 18 increases the number of flux lines intercepted by the receiving coil 22 which simulates a reduction in pyramid height, and causes the control circuitry to increase the magnetic field lift. With the phase lead provided by the damping circuitry, the effect is to damp oscillations in both Modes 2 and 3.

FIG. 7 illustrates another damping arrangement for inclusion in the circuitry of FIG. 3. In this arrangement, a magnetically coupled viscous damper 80 is mounted concentrically within the sensing coil 40 of the lower box 16. The damper 80 includes a viscous liquid 82 in which a permanent magnet 83 is supported for pivotal movement on a spindle 84. A weight 86 is affixed to the spindle 84 to prevent the magnet from being lifted by the permanent magnet of the pyramid out of its pivot socket in the base 88. This viscous damper 80 may be combined with the eddy current damping ring 78 of FIG. 6B, if desired. The magnet 83 is coupled to the permanent magnet 20 in the pyramid 18 and attempts to follow its radial motion in Modes 2 and 3. The viscous damping of the magnet 83 effectively damps such motion of the pyramid 18. This arrangement works especially well if the axial gap between the bottom of the pyramid 18 and the damping element 80 is small enough so that the damping magnet 83 moves nearly as much as the pyramid 18. The frequency of movement of the magnet 83 in the damping mode may be tuned to the oscillation frequency of Modes 2 and/or 3, in which case the excursions of the magnet 83 may even exceed the lateral movement of the pyramid 18, thus effectively damping the Modes 2 and 3 oscillations.

FIGS. 8 and 8A illustrate an arrangement essentially like that of FIGS. 5 and 5A with the addition of an eddy current damping plate 76 as in FIG. 6A. This arrangement in accordance with the invention permits the use of both the yaw and pitch receiving coils 72, 74 and the passive eddy current plate 76 to eliminate servo system excitation of Modes 2 and 3 oscillations and produce moderate electromagnetic damping of these modes. The ring 78 of FIG. 6B may be used in place of the plate 76, in which case the viscous damper 80 which is shown in FIG. 7 may also be used. Such a combination also permits magnetically coupled radial damping of pyramid movement.

The aluminum alloy plate 38, shown in FIG. 3 along the bottom of the upper box 12, is eliminated in the arrangements of FIG. 8. In its place, a sheet of plastic or some other magnetically inert material is installed.

Figure 9:
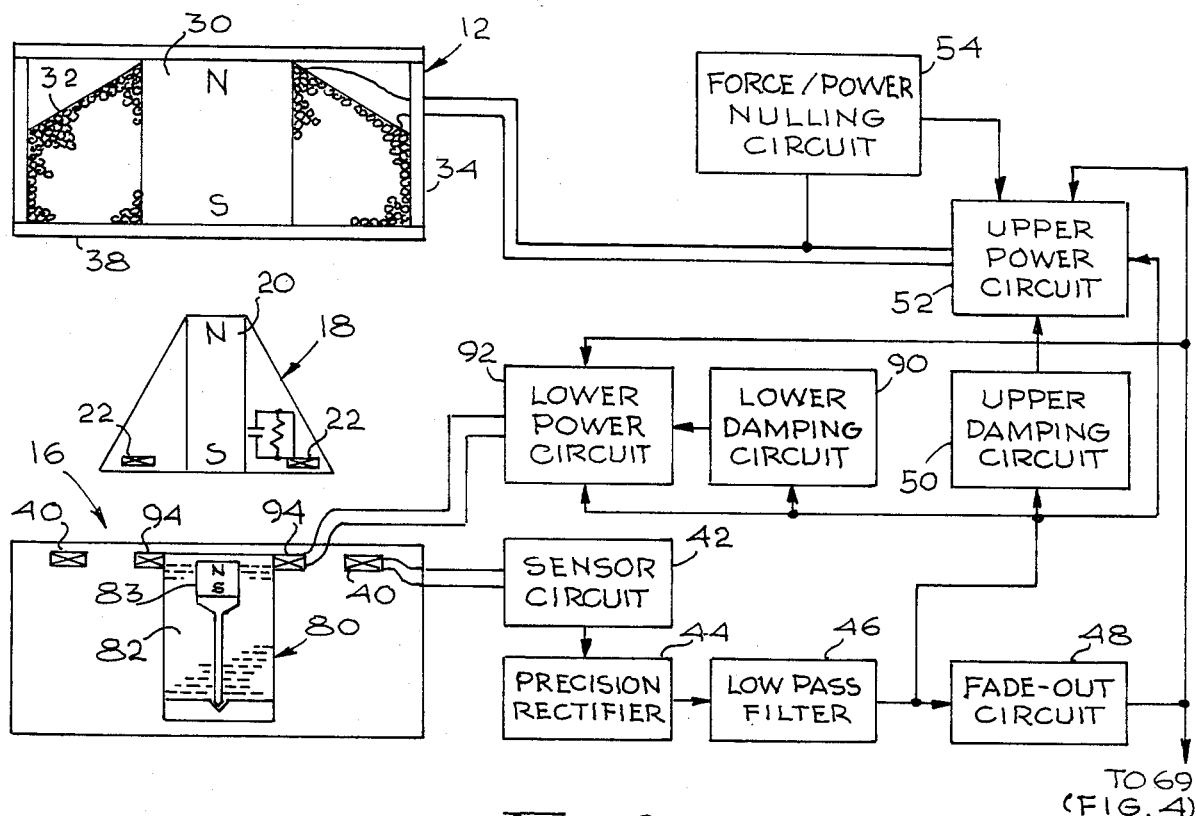
FIG. 9 is a combination block and schematic diagram of an arrangement in accordance with the invention which is alternative to that of FIG. 3.

FIG. 9 illustrates a different circuit arrangement for the levitation apparatus of FIG. 1 in which the upper box 12 is provided with an additional coil (or a substantially larger number of turns in the force cell 32) and an auxiliary force generating coil 94 is concentrically positioned within the sensing coil 40 in the lower box 16. Some of the blocks representing portions of the circuitry of FIG. 9 are the same as corresponding blocks in the circuitry of FIG. 3 and are designated by like reference numerals. In addition to the signals applied to the upper force coil 32, motion sensing signals are applied through a lower damping circuit 90 to a lower power circuit 92 which drives the force coil 94. It is preferable, but not essential, to include the magnetically coupled viscous damper 80 of FIG. 7. In this arrangement, the upper force coil 32 is used principally for static position control (damping of Mode 1 oscillations) but it may also be used as in the earlier embodiments for damping of oscillations in Modes 2 and 3. The force coil 94 in the lower box 16 is most effective for damping of oscillations in Modes 2 and 3, although it can also be used in cooperation with the upper force coil 32 to provide some damping of Mode 1 oscillations.

Figure 10:
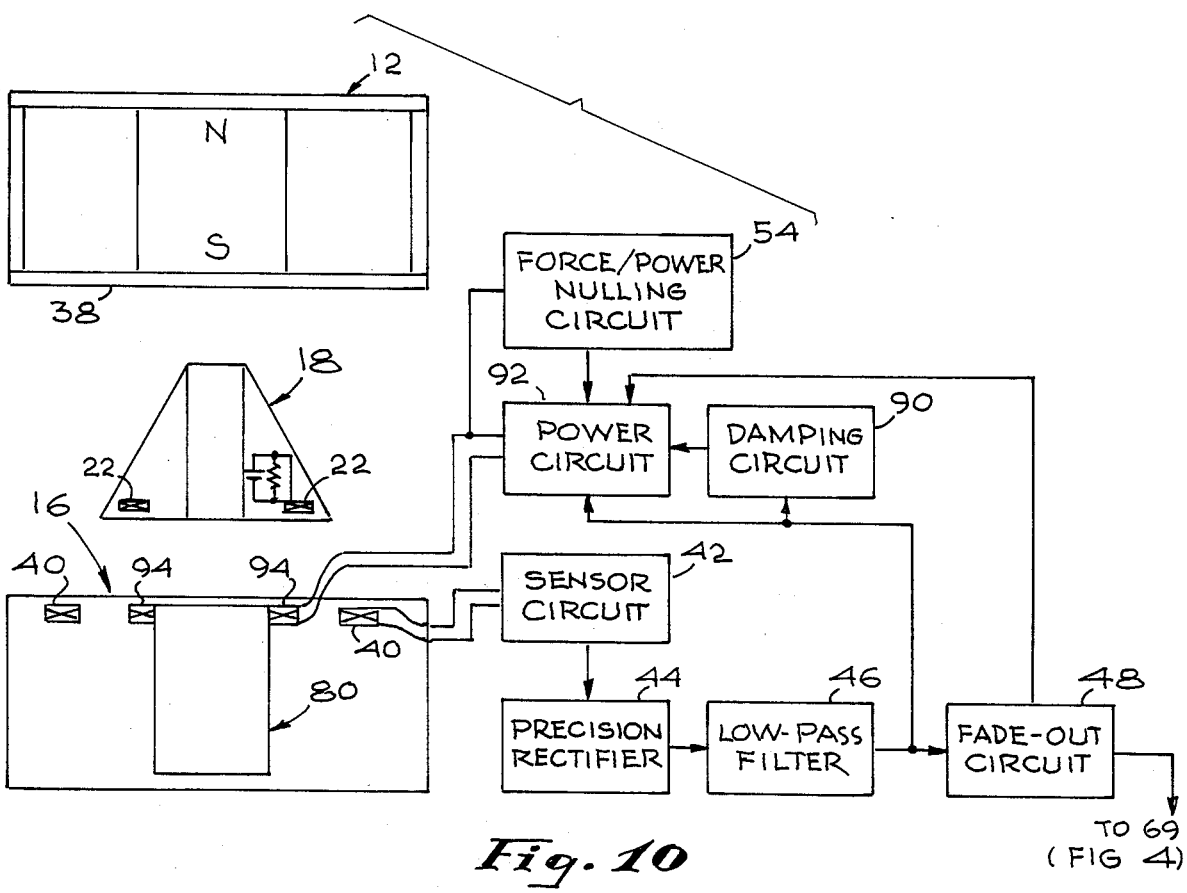
FIG. 10 is a combination block and schematic diagram illustrating another alternative arrangement to that of FIG. 3.

FIG. 10 represents still another arrangement in which the force coil and field excitation in the upper box 12 are eliminated and all position control is effectuated from the lower box 16. In this arrangement, the nulling circuit 54 is connected in the circuit driving the force coil 94. Some of the blocks representing portions of the circuitry of FIG. 10 are the same as corresponding blocks in the circuitry of FIG. 9 and are designated by like reference numerals. As in FIG. 9, the inclusion of the magnetically coupled viscous damper 80 is optional. In the FIG. 10 embodiment, the force coil 94 in the lower box 16 provides both static positioning and damping control for all modes of oscillation with optional augmentation of the passive radial damper 80. Care must be taken to avoid unintended interaction between the fields of the sense coil 40 and the force coil 94 in order to avoid electrical circuit oscillations. As in FIG. 8, the aluminum plate 38 is replaced by a plastic sheet.

Figure 11:
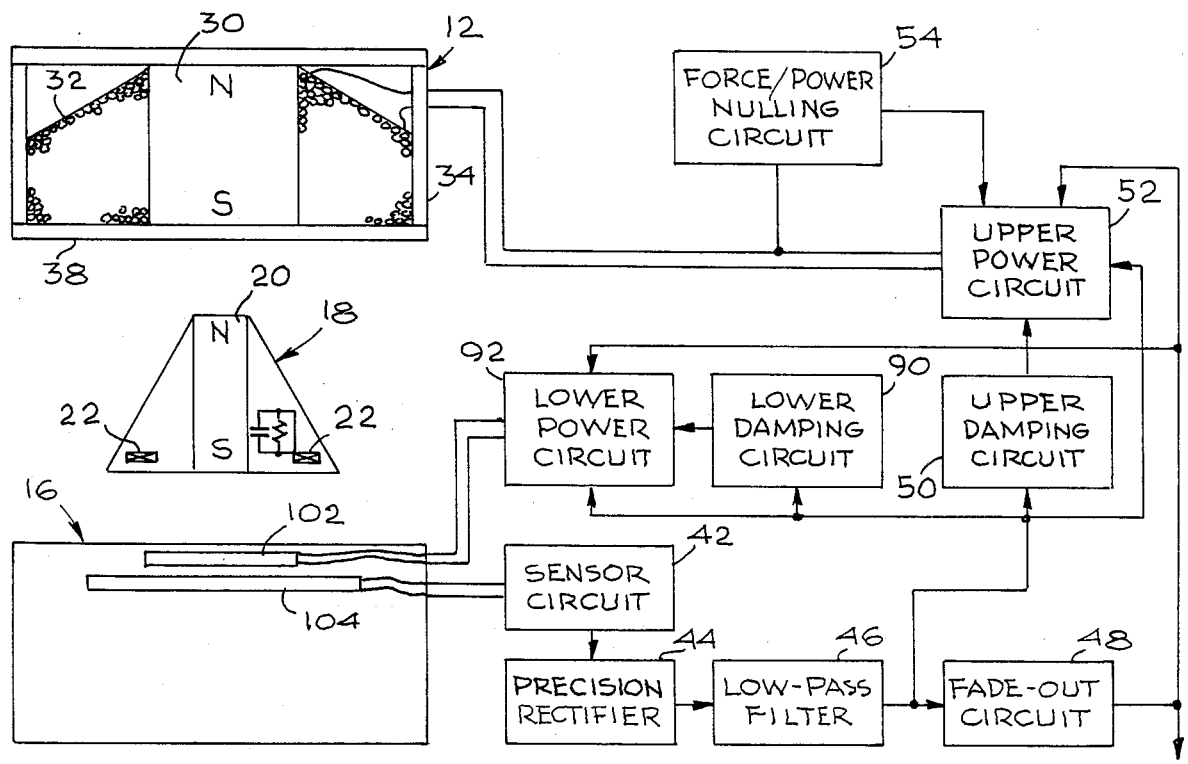
FIG. 11 is a combination block and schematic diagram illustrating still another alternative arrangement, comparable to FIG. 3.

The circuit arrangement of FIG. 11 is like that of FIG. 9, except for differences in the force coils and sense coils in the lower box 16. Like elements are designated by the same reference numerals. The coils of FIG. 11 are in the form of radial and axial coil arrays such as are shown in FIGS. 14 and 15. The force coil array in FIG. 11 has been designated by the reference numeral 102, whereas the sensing coil array is designated 104. These will be described in further detail in connection with FIGS. 14 and 15. With the provision of the radial and axial array for the force coil 102 in the lower box 14, it may no longer be essential to provide the force coil 32 in the upper box. Elimination of the force coil 32 from the upper box 12 would eliminate the requirement for the upper damping circuit 50 and power circuit 52, in which case the force/power nulling circuit 54 would be connected into the lower circuit in the manner shown in FIG. 10.

Figure 12:
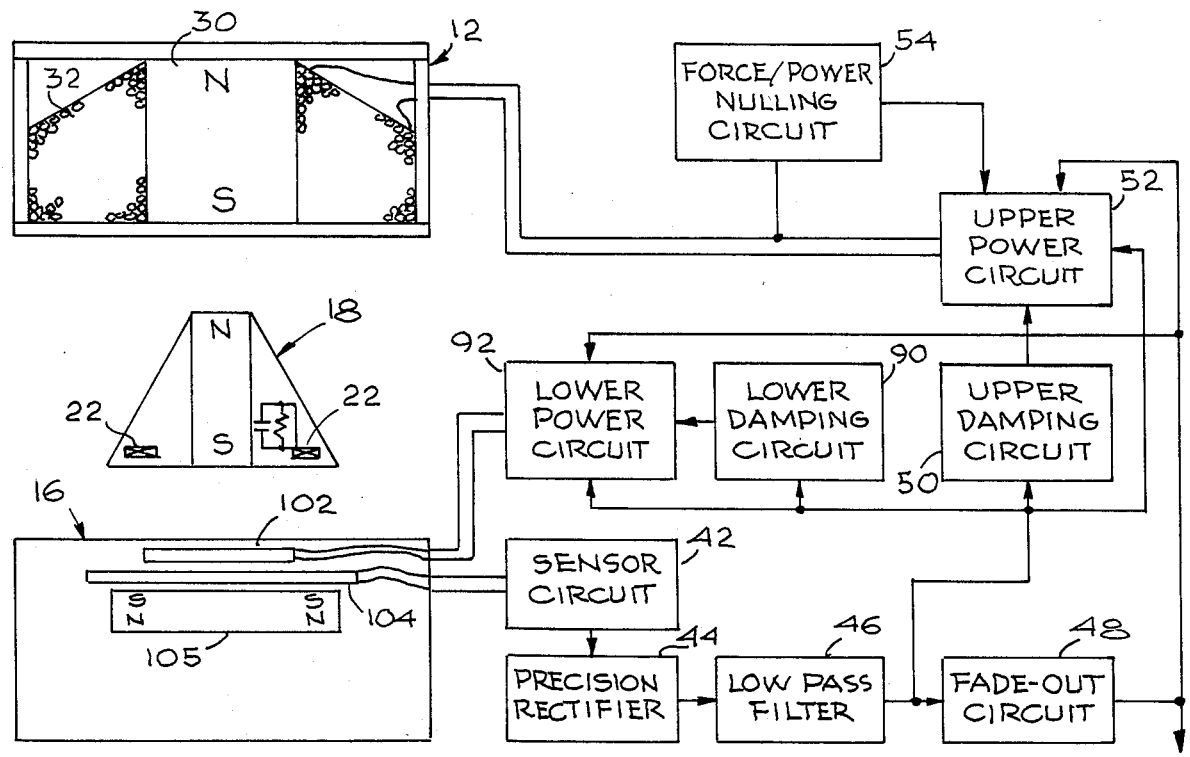
FIG. 12 is a combination block and schematic diagram representing yet another alternative arrangement to that of FIG. 3.

FIG. 12 shows still another version of the invention, like that of FIG. 11 with corresponding elements being designated by like reference numerals, in which a permanent magnet 105 is added in the lower box 16. The magnet 105 may be a disc or ring magnet, as desired. Again, as in the version of FIG. 11, the provision of the force coil 32 in the upper box 12 is optional. With the provision of the permanent magnet 105 in the lower box, the levitation system comprises a combination of the attraction and repulsion types discussed hereinabove.

The repulsion magnet 105 of FIG. 12 can be a plug magnet of ceramic material or an axial ring magnet at least twice the diameter of the magnet in the levitated member and, if provided with a small hole at the center, can function better. A plug type repulsion magnet produces a significant radial negative spring rate that would tend to induce translational overcenter position failure except for opposing forces generated by the radial movement sensing circuitry. By using a large diameter ring magnet, these radial negative spring rates can be reduced and the positive axial repulsion spring rate made less sensitive to radial position of the levitated member.

Figure 13:
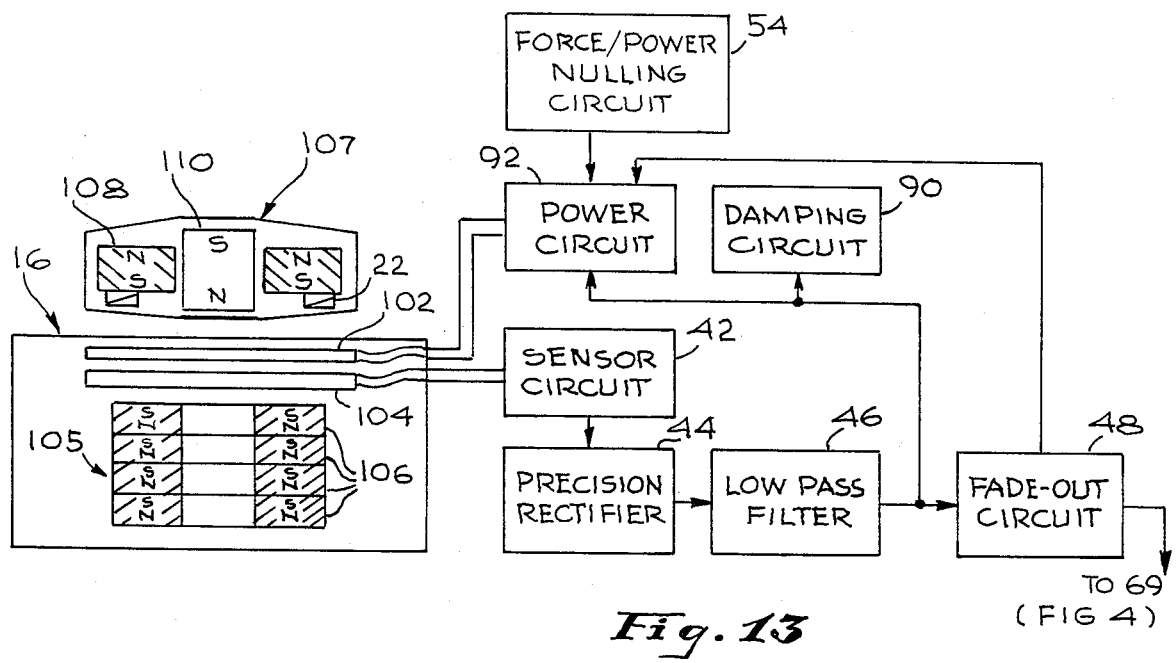
FIG. 13 is a combination block and schematic diagram showing still another alternative arrangement to that of FIG. 3.

FIG. 13 shows a version of the invention which is a pure repulsion type of levitation system. Some of the elements of FIG. 13 correspond to like elements of FIG. 12 and are designated by like reference numerals. In this version, the permanent magnet 30 and the force coil 32 of the upper box 12 (as shown in FIG. 12, for example) have been eliminated, together with the associated circuitry for driving the upper force coil. The lower box 16 contains a permanent magnet element 105 formed of a plurality of ring magnets 106. The levitated member 107, now shown in a more cylindrical shape, contains a ring magnet 108 and a concentrically positioned plug magnet 110 having the polarities shown in the figure. The polarity of the magnet 110 is opposite to that of the ring magnet 108 in order to shape the field and flux lines resulting from these magnets to provide a greater force of repulsion in interaction with the field and flux lines developed by the permanent magnet element 105 in the lower box. The levitated member 107 contains a target coil 22 connected in a closed resonant circuit with a capacitor and resistor, as previously shown and described (the capacitor and resistor having been omitted from FIG. 13 for convenience of illustration).

The different configuration of the permanent magnets in the levitated member 107 of FIG. 13 is made with a limited dimension in the axial direction to assure that the "center of bouyancy" will be above the center of mass. The permanent magnet element 105, oriented as a repulsion magnet below the levitated member in FIG. 13, provides a ring magnet of the same or greater diameter than that of the ring magnet 108 in the levitated member. The hole in the lower repulsion magnet, the hole in the levitated ring magnet and the oppositely magnetically oriented plug magnet 110 enhance the resistance to overturning of the levitated member. The arrangement of the permanent magnet elements in the FIG. 13 version assures long term stability (resistance to overcenter failure) in both vertical position and overturning orientation. Translational overcenter failure would occur for a purely passive system, due to the negative radial spring rates. This is overcome by the translational movement servo system. Resonance response in all three modes is damped effectively by the active servo system including the axial and radial sense coil array and the axial and radial force coil array.

Figure 14A:
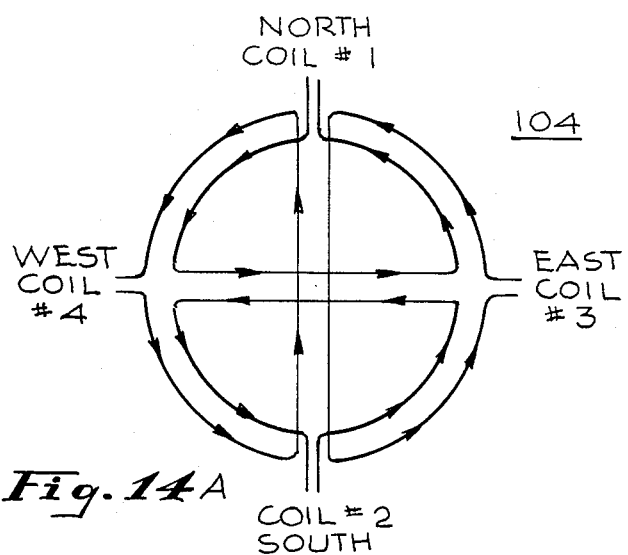
FIGS. 14 (A, B and C) are diagrams representing particular configurations of the sense coils which may be employed in arrangements in accordance with the invention.

FIGS. 14(A, B and C) illustrates three alternative configurations for the radial and axial sensing coil array 104 of FIGS. 11, 12 and 13. Any one of these configurations may be used in the circuits of those figures. FIG. 14A represents four hemispherical coils, overlapping at 90° intervals as shown. The coils are labelled #1, #2,

3, and #4 in a north-south/east-west orientation. The connections to the coils are brought out at 90° points about the circumference, and the currents are phased to flow in the direction of the arrows. This produces a cancellation of current fields in the center of the array and reinforcement of the fields about the periphery.

Figure 14B:
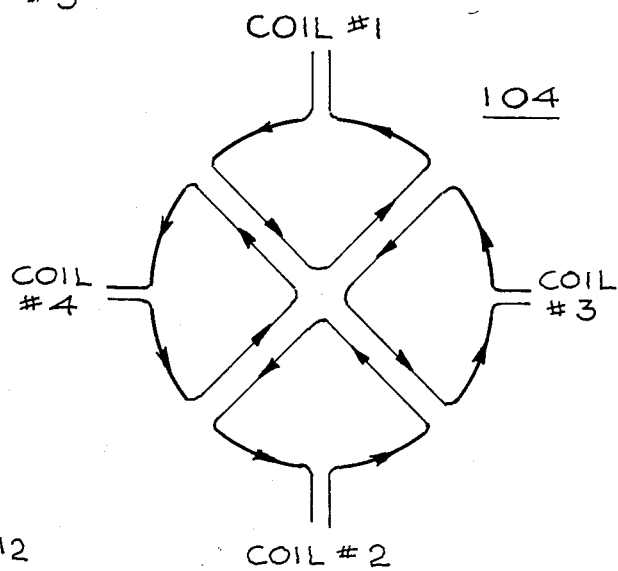

FIG. 14B shows a slightly different orientation of coils for the sensing array 104 of FIGS. 11-13. This comprises four quadrature coils, numbered 1-4, with current flow in the directions of the arrows. As with FIG. 14A, the current fields cancel out within the array but enhance each other about the circumference of the array because of the direction of current.

Figure 14C:
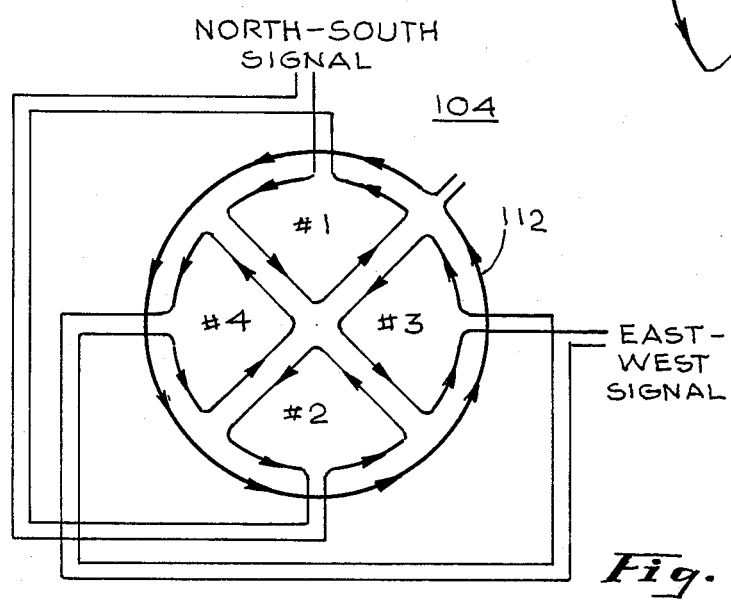

The sensing coil array 104 of FIGS. 14A-C is effective to sense horizontal or transverse displacement of the target coil 22 in the levitated object for axial symmetry. This array also senses vertical distance to the target coil. The coil configurations of FIGS. 14A and 14B function as four inductive elements of four tuned tank circuits. The Q of each circuit, and thus the amplitude of tank circuit oscillation, indicated the proximity of the target coil. The circuit in which these individual coils of FIGS. 14A and 14B are connected will be described in connection with FIG. 18.

Figure 19:
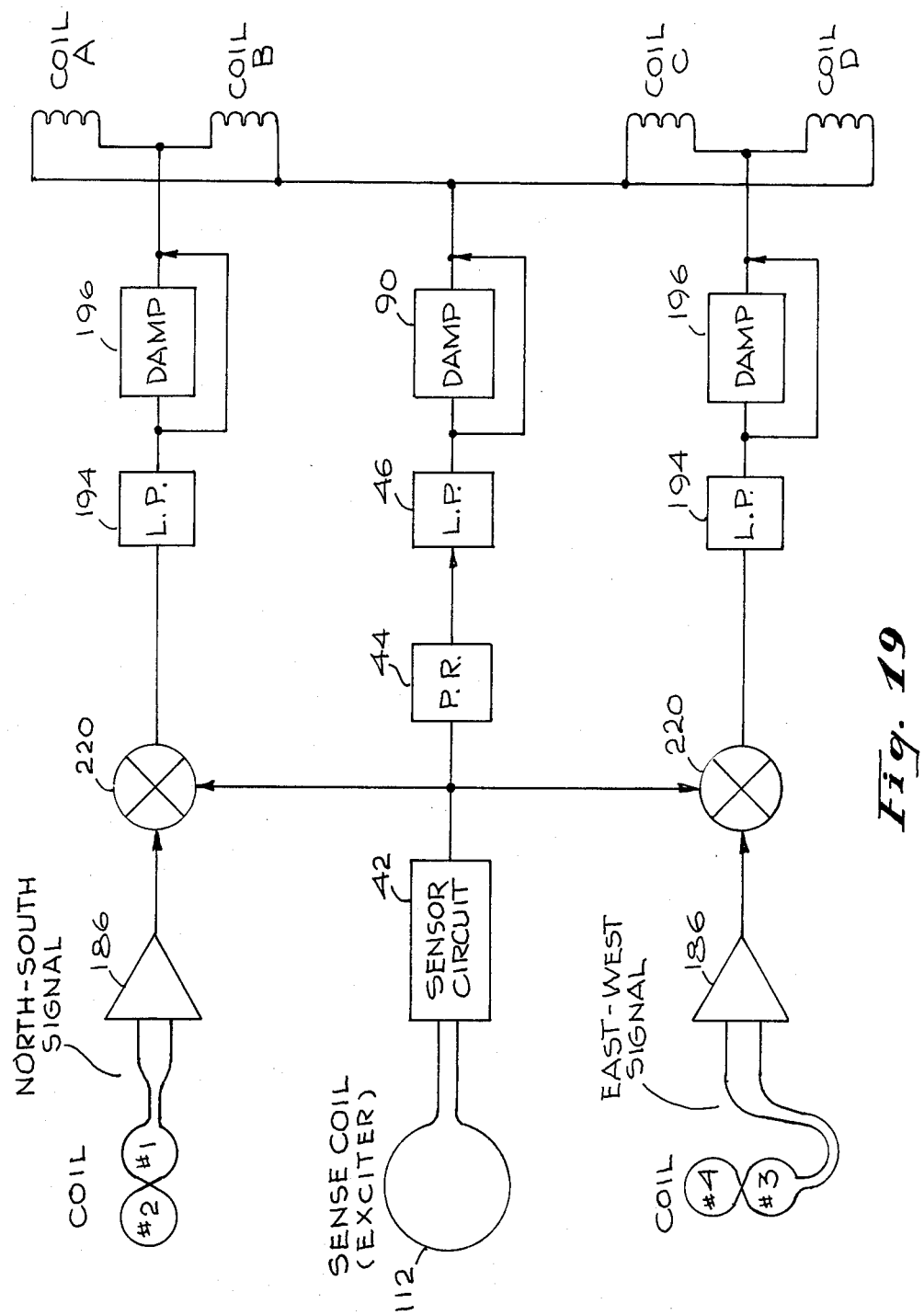
FIG. 19 is a functional block diagram showing a circuit arrangement for use with the sense coil array of FIG. 14C and the force coil array of FIG. 15.

The sensing coil array 104 of FIG. 14C is different, in that in addition to the individual quadrature coils Nos. 1-4, a circumferential excitation coil 112 is included in the array. Also it will be noted that opposite quadrature coils are interconnected in series to develop a double figure 8 configuration. Thus, coils Nos. 1 and 2 are connected in series with each other to develop a combined north-south signal; coils Nos. 3 and 4 are similarly connected to develop a combined east-west signal. The sense or excitation coil 112 requires a circuit similar to that shown in FIG. 16 for driving excitation. Each individual quadrature coil senses alternating flux lines passing through it which are induced by the excitation coil 112. The voltages generated in the two halves of a figure 8 pair cancel each other out if the target coil 22 of the levitated member is symmetrically located over that particular figure 8 pair. If the target coil is displaced from the center of a figure 8 coil pair, the voltages generated in the two individual coils do not cancel. The phase of the resultant signal indicates the direction of radial translation of the target coil, and the amplitude of that signal indicates the extent of the translation. A particular circuit with which the sense array 104 of FIG. 14C may be operated is shown in FIG. 19.

FIG. 15 represents schematically a coil configuration for the radial and axial force generating electromagnet coil array 102 of FIGS. 11-13. This array develops vertical forces, both up and down, and translational forces in any compass direction. The magnitudes of these forces can be controlled by circuitry, such as that shown in FIG. 18, as a function of the vertical and translational positions and velocities of the levitated member, as sensed by the sense coil array 104.

Figure 15A:
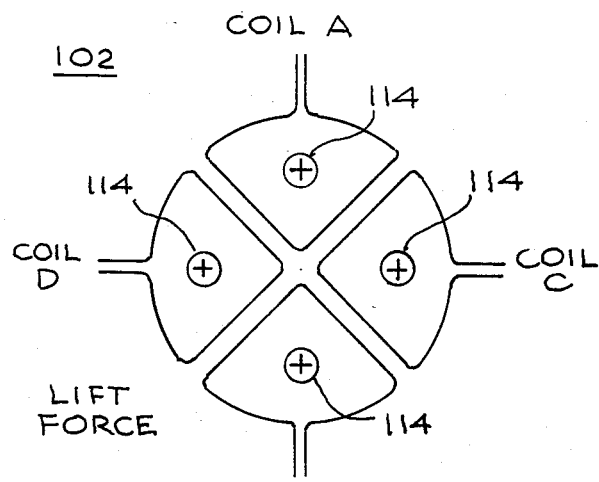
FIGS. 15 (A and B) are diagrams representing particular configurations of force coils which may be employed in arrangements in accordance with the invention.

FIG. 15A shows quadrature coils A-D with magnetic fields developed by each individual coil of a polarity to develop a lifting force for the levitated member. This is indicated in FIG. 15A by the encircled arrow tails 114, corresponding to a direction of the magnetic flux lines pointing into the paper. Development of the flux lines pointing in the opposite direction (coming out of the paper) would develop an anti-lift force. For direct axial force, the strength of the fields in all of the coils A-D would be the same.

Figure 15B:
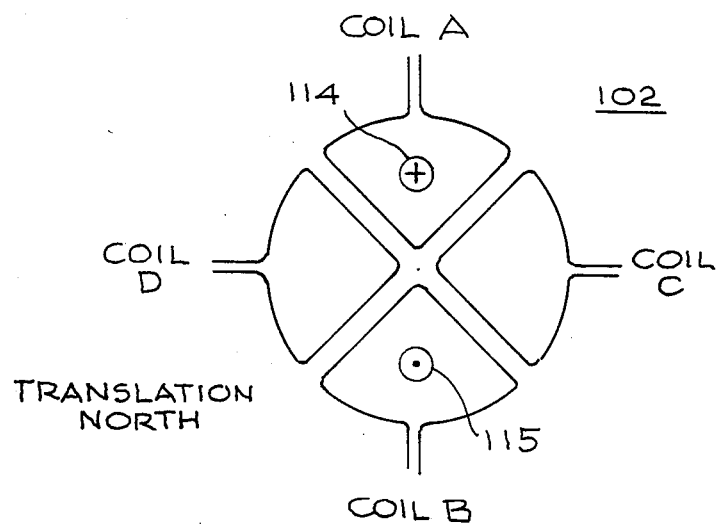

FIG. 15B shows the force coil array 102 being driven to develop a translational force in a north direction (according to the convention adopted with respect to FIG. 14.) In FIG. 15B, coil A is shown developing a field with flux lines pointing into the paper (indicated by the tail of the arrow 114). In coil B, displaced by 180°, the field is developed with flux lines in the opposite direction (coming out of the paper—indicated by the point of arrow 115). Coils C and D are not developing any magnetic field in the example of FIG. 15B. Reversing the direction of the fields in coils A and B would develop a translational force in the opposite direction (south). By energizing coils C and D while not energizing coils A and B, a translational force can be developed in either the east or west direction. Suitable combinations of magnetic fields in all four of the coils can serve to develop a translational force in any direction of the compass.

Figure 16:
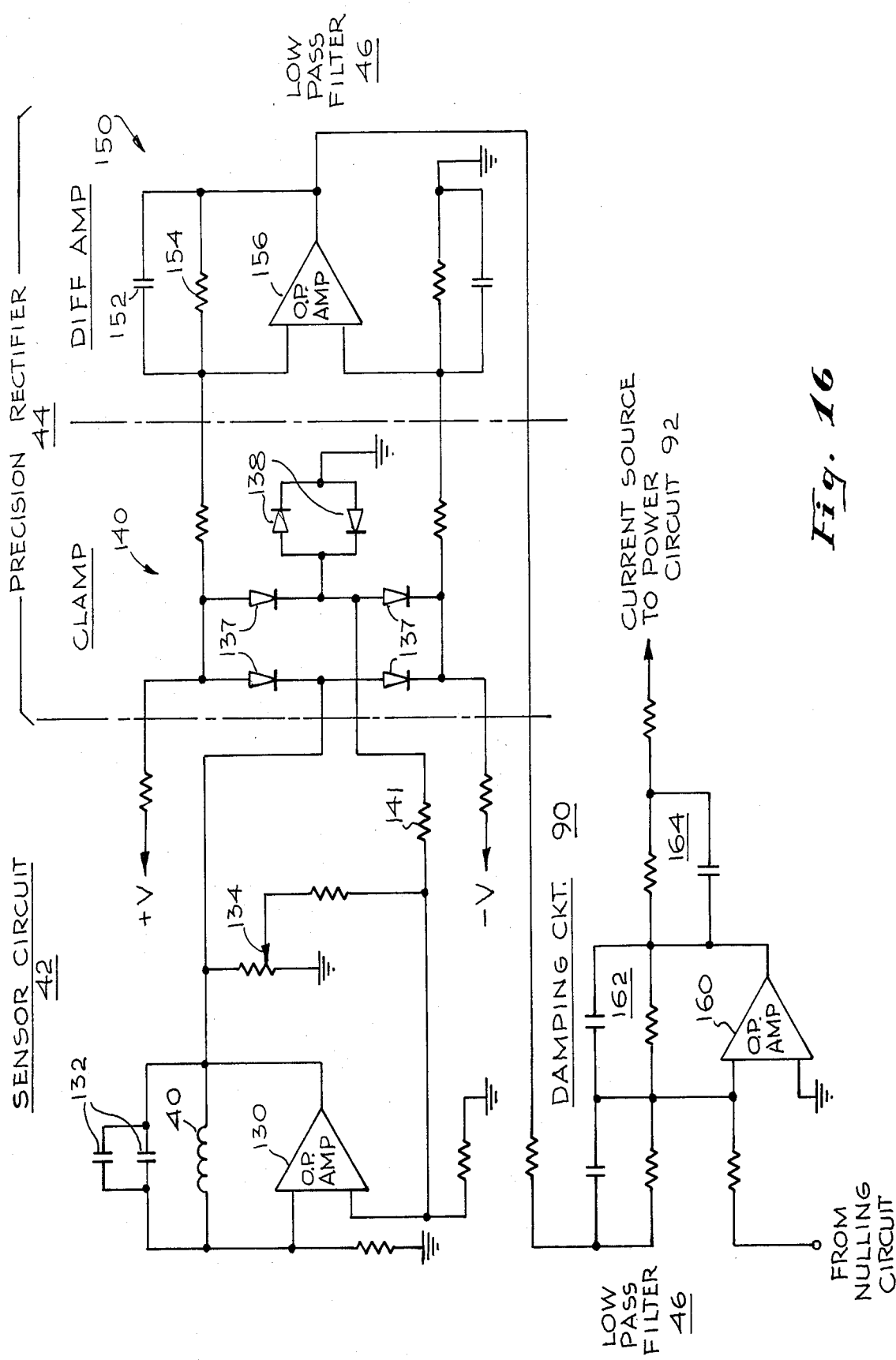
FIG. 16 is a schematic diagram illustrating portions of the circuitry employed in the present invention.

FIG. 16 illustrates schematically some of the circuitry for monitoring the pyramid position and movement, as may be used in the block diagram of FIG. 3, for example. In the upper left-hand corner of the figure is the sensing circuit 42 in the form of an oscillator comprising an operational amplifier 130 in circuit with the excitation or sensing coil 40. Tuning capacitors 132 are connected in the feedback circuit of the amplifier 130. A potentiometer 134 is provided in the feedback path to the low input of the amplifier 130 to permit adjustment of circuit operation when the levitation apparatus is being set up for demonstration. The output of the oscillator circuit is applied to a clamping circuit 140 and then directed to a differential amplifier 150 to develop a lead angle phase shift by virtue of the capacitor 152 and resistor 154 connected in a feedback path of operational amplifier 156. A signal from the potentiometer 134 provides proportional feedback to the amplifier 130, while clamped feedback from the diodes 137, 138 in the clamping circuit 140 is provided to the same point via resistor 141. The clamping circuit 140 and the differential amplifier 150 together comprise the precision rectifier 44 of the overall circuit arrangement (see FIG. 3). The signal from the differential amplifier stage is applied to low pass filter 46 operating in conjunction with operational amplifier 160 in damping circuit 90. The signals applied to the operational amplifier 160 are combined with an output from the nulling circuit 54 of FIG. 3. The amplifier 160 and its associated circuitry including the resistance-capacitance networks 162, 164 serves as a current source for signals directed to power circuit 92.

FIG. 17 is a block diagram illustrating a feature of the invention by which a demonstrator of the levitation apparatus may mystify an uninformed observer. This circuit shows the ON and OFF switches for controlling one portion of the power turn off stage 60 of FIG. 4. These switches 170, 172 are connected in circuit with a series resistor 174 to the set/reset input of a flip flop 176 across the battery supply 62 and power supply output 61. The switches 170, 172 are magnetically responsive reed switches and are strategically located within the lower box 16 at positions between different pairs of legs 14 (FIG. 1). To use this feature, the demonstrator of the apparatus removes the pyramid 18 (which has been supported in the levitation mode) from the space between the boxes 12, 16 by passing it between the two legs 14 over the OFF switch 172. This closes the switch 172, causing the flip flop 176 to turn off the power supply 61. The pyramid is now handed to the observer with an invitation to insert the pyramid between the two boxes for levitation. Retracing the exit path will not be effective in turning on the power supply; neither will inserting the pyramid through the open space where the fourth leg is missing. Only by inserting the pyramid through the space adjacent the other leg, where the ON switch 170 is located, can the power supply be turned on and the pyramid again levitated.

Figure 18:
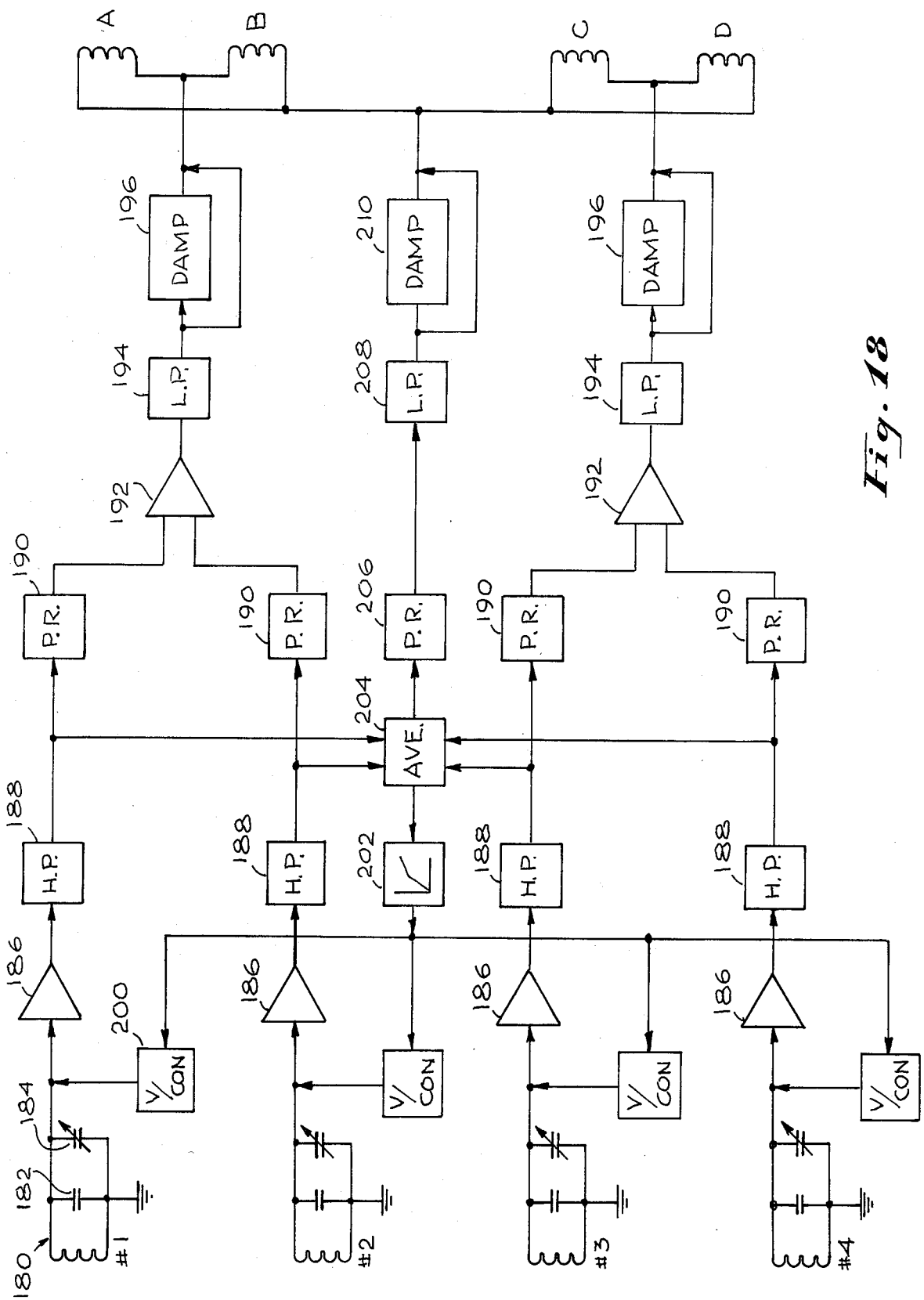
FIG. 18 is a functional block diagram illustrating a particular circuit arrangement for use with the sense and force coil arrays of FIGS. 14 (A, B) and 15.

FIG. 18 is a functional schematic diagram of circuitry which may be used with the radial and axial sensing array 104 and the radial and axial force coil array 102 of FIGS. 11, 12 and 13. More particularly, the circuit of FIG. 18 is adapted for use with the sense coil arrays of FIGS. 14A and 14B, whereas the circuit of FIG. 19 is for use with the sense coil array of FIG. 14C.

The circuit of FIG. 18 is shown with the separate coils Nos. 1–4 each individually connected in a corresponding oscillator tank circuit. Since the circuitry which is operative with each of the individual coils is identical, it can be described in terms of coil No. 1 at the top of the figure. Coil No. 1 serves as the inductance in a tuned tank circuit 180 having a fixed capacitor 182 and a variable capacitor 184 for tuning. The signal from the tank circuit is applied to an amplifier 186 of the voltage follower type, serving as a buffer. The sensed signal from the amplifier 186 is supplied through a high pass filter 188 to a precision rectifier stage 190. As shown in FIGS. 14A and 14B, coils 1 and 2 are oriented for sensing of north-south translational motion of the levitated member, whereas coils 3 and 4 are oriented for sensing of east-west motion, and all four of the coils are used to sense axial motion. The signal processing channels of coils Nos. 1 and 2 are connected as the dual inputs of a differential amplifier 192 having finite gain, followed by a low pass filter 194 and a damping circuit 196 which includes signal differentiation and dc gain. Similar circuitry is provided for the two signal channels associated with sensing coils Nos. 3 and 4. The signal at the input of the damping circuit 196 connected in series with the channel from coils Nos. 1 and 2 represents a translational position signal in the north-south orientation. Differentiation of this signal in the damping circuit 196 provides a translational velocity signal which is combined at the output with the translational position signal and applied to drive the force coils A, B (of FIG. 15) to develop the desired correction of the levitated member. Similarly with respect to the lower channel coupled to sense coil Nos. 3 and 4, the combined east-west translational position and velocity signal is applied to the east-west force coils C and D.

In addition to the circuitry thus far described for FIG. 18, a voltage-to-current converter stage 200 is coupled to the signal input to the buffer amplifier 186. This converter stage has adjustable gain and serves to provide a controlled current in a current injection circuit at this point. The voltages applied to the respective voltage-to-current converters 200 are developed in common from a non-linear gain amplifier as an average signal from an averaging stage 204 which receives as its inputs the signals at the outputs of the various high pass filter stages 188. This average circuit 204 also applies a signal through a precision rectifier stage 206 which is then fed to a low pass amplifier 208 and a damping circuit 210, like the damping circuit 196. The output of damping circuit 210 is applied to the common junction of all of the force coils A–D.

In the operation of the circuit of FIG. 18, the tank circuits of coils 1–4 are coupled via those coils to the target coil 22 in the levitated member. All of these resonant circuits are tuned to the same frequency. The tank circuits 180 are excited by current injection from corresponding voltage-to-current converters 200 at or near the natural frequency of the tank circuit. The buffer amplifier 186 serves to prevent the following circuitry from loading the tank circuits. The output of the buffer amplifier 186 is conditioned by the high pass filter 188 which has been modified so that it has no phase angle shift between input and output at the frequency of the tank circuit. This filter operation removes low frequency signals that are imposed on the tank coils by the force generating coils.

Averaging of the signals from the high pass filter stages 188 and application of this averaged signal through the non-linear gain stage 202 to the converter stages 200 serves to insure that all of the tank circuits are driven at the same frequency. The non-linear gain stage 202 uses signal clamping techniques to provide a signal that is locked in phase to the oscillation of the tank circuits, with its amplitude being a combination of a clamped signal and an unclamped signal. The phase angles of all four tank circuits 180 can be set to the same value by adjusting the variable capacitor 184 in each tank circuit. The non-linear gain stage 202 is designed so that the amplitude of oscillation of each tank circuit is essentially a linear function of the axial and radial distance of the target coil to each coil in the sense coil array.

Precision rectifying of the output of the high pass filters 188 serves to produce a dc signal that is linearly proportional to target coil position. This precision rectification also removes nearly all of the residual low frequency signals induced in the sense coil array by the force generating coil array. Subtracting the different signals from each other in the differential amplifier 192 results in a signal which is sensitive only to the north-south (for coil Nos. 1 and 2) horizontal, radial, translational movement of the levitated object. Similar subtraction in the corresponding differential amplifier for signals from coil Nos. 3 and 4 provides the same type of signal for east-west movement. Precision rectification in the stage 206 of the averaged tank signal from the averaging stage 204 develops a signal which is proportional to the height or axial position of the levitated member. Processing of the radial translational signals in the filters 194 and damping circuits 196 provides signals that lead in time the position of the levitated members. These signals are then amplified as required and applied as drive currents to the radial and axial force generating electromagnet array 102, comprising the force coils A, B, C, and D of FIG. 15 to compensate for the movement of the levitated object as sensed by the sense coils.

FIG. 19 is a functional schematic diagram of signal processing circuitry used in conjunction with the sense coil array of FIG. 14C and the force coil arrangement of FIG. 15. FIG. 19 depicts certain circuit elements which are identical to corresponding elements of other figures such as FIGS. 13 and 18, for example, and are designated by like reference numerals. The circuitry for the figure 8 sense coil combinations of coils Nos. 1 and 2 (north-south) and Nos. 3 and 4 (east-west) is much the same as that shown and described in connection with FIG. 18. The sense coil 112, serving as an excitation coil, uses a circuit much like that shown in FIG. 16, and comprises a sensor circuit 42 coupled to the excitation coil 112 to develop a signal which is then applied to precision rectifier 44, low pass filter stage 46 and a damping circuit 90. Sense signals from the figure 8 coils, as developed at the outputs of the buffer amplifiers are then applied to respective multiplier stages 220, each of which also receives a signal from the sensor circuit 42. The outputs of the multiplier stages 220 are then processed in the manner described for FIG. 18 via low pass filters 194 and damping circuits 196. The resulting signals from these three channels are applied to the force coils A, B in the manner shown and previously described. The signals developed from the figure 8 coils, as processed and applied to the common point between coils A and B or coils C and D, as the case may be, represent the translational position and translational velocity signals for the north-south and east-west coils, respectively (or appropriate vector components of the actual translational movement). The signals processed from the excitation coil 112 and applied to the common connection to all of the force coils A–D correspond to axial position and velocity of the levitated member. A combination of these signals serves to provide the necessary correcting forces in the force coils.

Some considerations regarding the various versions of the levitation apparatus as shown in the drawings may warrant discussion. The version of FIG. 9 utilizes electromagnetic force coils both above and below the levitated object. These coils are driven by circuitry that uses signals from the sense coil in the lower box to determine the position and velocity of the levitated member. Axial position and velocity are unambiguously determined by the sense coil, but translational position and velocity are determined in polar plane and magnitude without information as to sign (for example, the translational position could be at 27° or 207°). In this version, the sense coil used to drive the lower electromagnet force coil should be below the levitated member. Any sense coil used to drive the upper electromagnet should be above the levitated member. Such an arrangement makes it easy to have force applied to either end of the levitated member lead in time and be 180° out in directional phase from the position of that end of the levitated member, regardless of which of the three modes of vibration are to be damped. The version of FIG. 9 only provides a sense coil at the bottom. Mode 1 oscillations have a motion that has the same phase at the top and bottom of the levitated member. Mode 2 oscillations have a motion that is in phase at both the top and bottom but, in the case of the pyramid shown, has different amplitudes because there is more motion at the bottom than at the top (see FIG. 2). Mode 3 oscillations have a motion that is 180° out of phase at the top and bottom, but the magnitude of the two motions is nearly equal. Thus, the servo system coil version of FIG. 9, in order to be optimally stable, should have a 180° phase reversal plus a phase lead throughout the frequency range of all three modes for the force generating coil in the lower box. The servo system must provide a 180° phase reversal plus a phase lead for oscillation in Modes 1 and 2 with a 180° phase reversal plus a phase lag for Mode 3 oscillations for the upper electromagnetic force coil.

Considering the version of FIG. 10, the electrical power which is required to produce a given axial force on the levitated member is less for the bottom force coil than for the upper force coil which is used in other versions. There are three reasons for this: (1) the distance between the permanent magnet in the levitated member and the electromagnet force coil is less for a bottom force coil than for one at the top; (2) the size of the force coil at the bottom is smaller, thus producing fewer flux lines that do not intercept the magnet in the levitated member; and (3) it is easier for the electromagnet force coil to reroute the flux lines emanating from the magnet in the levitated member if the magnetic coercion of the upper lift permanent magnet does not have to be overcome. This militates in favor of using an electromagnet force coil and supporting magnets only in the lower box, as in the version of FIG. 13. Unfortunately, there is a disadvantage in depending upon a lower force coil to generate all of the electromagnet force required by the servo system. A lower force coil can develop a relatively large mutual inductance with the sense coil also positioned at the bottom. It becomes necessary to either limit this mutual inductance or, through electronic circuit means, decrease the effect of mutual inductance on servo system inductively coupled gains to avoid electromagnetically coupled system oscillations.

One way to minimize this problem is to excite the sense coil at a sufficiently high frequency that few turns of the sense coil winding are required. Since the closed loop gain which must be less than 1 for the magnetically coupled system is proportional to the ratio of sense coil turns to force coil turns, this solution is quite effective. Another way of dealing with the problem is to orient, size or position the sense and force coils with respect to each other to minimize their mutual inductance. Another way is to use a combination of a high pass filter and a low pass filter having no phase shift at the frequency of the sense coil oscillation but capable of attenuating low frequency signals generated in the sense coil by the field of the electromagnet force coil, as in the circuitry of FIGS. 16, 18 and 19. Also, the use of a precision rectifier circuit to produce a dc signal which is proportional to the area under each half lobe of the sense coil oscillation signal, as in the circuits of FIGS. 18 and 19, serves to invert each half cycle of the low frequency signal superimposed on the sense signal with the resultant averaging and cancellation of this superimposed signal.

Various arrangements of magnetic levitation apparatus in the forms shown and of circuit arrangements for effectively developing and stabilizing the magnetic levitation system have been shown and described hereinabove. In these particular arrangements of the invention, the apparatus is entirely self-contained so that there is no external evidence that electrical power is utilized in the magnetic levitating apparatus. Such is not, of course, essential to the practice of the invention but may be of interest in particular applications. These arrangements incorporate feedback circuitry which controls the electromagnet force coil to draw power only as needed to correct deviations of the levitated object from a null position where it is supported solely by the permanent magnet field, thus reducing the power drain on the power supply to a minimum. Various circuit, coil and magnet arrangements are disclosed to achieve the desired damping of translation and velocity of the levitated object in the natural modes of oscillation. Thus effective damping is provided for axial movement, transverse movement and turning movements of the levitated object, relative to the static force null position. Provision for recharging the self-contained battery power supply is incorporated in the apparatus, as well as special arrangements for turning off the circuit power where the system is dormant for a predetermined period of time or at the option of a user who is demonstrating the apparatus.

Although there have been described above specific arrangements of a magnetic levitation system in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. Magnetic levitating apparatus comprising:
   a first magnetic element mounted to support an object to be levitated in a magnetic field;
   a magnetic member including a second magnetic element for placement in a position to be levitated by magnetic field interaction between the two magnetic elements, at least one of said magnetic elements being a permanent magnet;
   electromagnetic induction means for monitoring the position and velocity of the magnetic member relative to a null position, the electromagnetic induction means comprising target coil means mounted for movement with the magnetic member and stationary sense coil means inductively coupled to the target coil means;
   electromagnetic field generating means including at least one force generating coil for modifying the magnetic levitation field; and
   circuit means coupled between the sense coil means and the electromagnetic field generating means for selectively controlling an electrical current in the force generating coil in response to electrical signals from the sense coil means.

2. The apparatus of claim 1 wherein the sense coil means comprises a single coil coupled to an oscillator tank circuit to induce current in the target coil means.

3. The apparatus of claim 1 wherein, during levitation, the first and second magnetic elements are substantially aligned along a common axis.

4. The apparatus of claim 3 including a target coil concentrically positioned relative to said axis and in a plane generally perpendicular to said axis.

5. The apparatus of claim 4 wherein the target coil is connected in a closed loop in series with a tuning capacitor.

6. The apparatus of claim 5 including a sense coil mounted in a plane generally perpendicular to said axis and concentric therewith, and wherein the sense coil has a diameter greater than the target coil.

7. The apparatus of claim 6 wherein the circuit means includes a sensor circuit electrically connected to the sense coil means, said sensor circuit having an oscillator for establishing a current in the sense coil means and further including means for detecting variations in said current due to loading by reflected impedance from the target coil means.

8. The apparatus of claim 7 wherein the circuit means includes means for detecting both movement and velocity of the magnetic member when it is levitated.

9. The apparatus of claim 8 wherein the detecting means includes means for detecting axial, transverse and tilting movements of the second magnetic element.

10. The apparatus of claim 9 further including means for damping said detected movements of the magnetic member.

11. The apparatus of claim 10 wherein the damping means comprises a magnetic viscous damper mounted coaxially within the sense coil means.

12. The apparatus of claim 11 wherein the magnetic viscous damper includes a magnet mounted on a pivot within a viscous liquid for generally transverse movement relative to said axis under the influence of the second magnetic element.

13. The apparatus of claim 10 wherein the damping means comprises an eddy current damping element located coaxially of the sense coil means, the damping element extending generally transversely to said axis.

14. The apparatus of claim 13 wherein the damping element comprises a conducting plate.

15. The apparatus of claim 13 wherein the damping element comprises a conducting ring.

16. The apparatus of claim 9 including a pair of additional target coils fixed in position relative to the second magnetic element for movement therewith, said additional target coils being mounted in respective orthogonal planes relative to each other and to the other target coil.

17. The apparatus of claim 16 wherein said additional target coils are inductively coupled to the sense coil means when the magnetic member is being levitated, said additional coils developing signals corresponding to yaw and pitch movements of the magnetic member.

18. The apparatus of claim 17 wherein each of said additional coils is individually connected in a closed loop in series with a tuning capacitor.

19. The apparatus of claim 3 wherein the first and second magnetic elements are both permanent magnets with opposite magnetic poles facing each other.

20. The apparatus of claim 19 wherein the force generating coil is tapered between the inner diameter and outer diameter of the coil, said taper being in the direction of diminishing cross section with increasing radius.

21. The apparatus of claim 20 further including a housing substantially enclosing the first magnetic element and the force generating coil, said housing being generally in the form of a closed box.

22. The apparatus of claim 21 wherein said box is positioned above the position of the levitated object.

23. The apparatus of claim 22 wherein the magnetic member comprises a housing substantially enclosing the second magnetic element and the target coil means.

24. The apparatus of claim 23 wherein said housing is generally in the form of a truncated pyramid and wherein the target coil means includes a first coil surrounding the second magnetic element adjacent the base of said pyramid and coaxial therewith.

25. The apparatus of claim 24 wherein the first coil comprises a closed circuit path for current induced therein.

26. The apparatus of claim 25 further including a lower box having a housing defining said box, the lower box being positioned below the levitated object and enclosing said circuit means and the sensing means.

27. The apparatus of claim 26 further including a plurality of legs extending between the upper box and the lower box, at least one of said legs being hollow to define a path for electrical wires connecting the force generating coil in the upper box to the circuit means in the lower box.

28. The apparatus of claim 27 further including a first magnetically responsive switch concealed in a first position adjacent an upper surface of the lower box, said switch being effective, when actuated, to turn off power to said circuit means.

29. The apparatus of claim 28 further including a second magnetically responsive switch in a second concealed position adjacent the upper surface of the lower box and spaced from said first switch, said second switch being effective, when actuated, to turn on power to said circuit means.

30. The apparatus of claim 29 wherein said first and second switches are reed switches.

31. The apparatus of claim 30 wherein each of the switches is actuatable in response to the placement of the magnetic member near the position of the switch.

32. The apparatus of claim 23 wherein said housing comprises a plurality of magnetic shield members along the sides and top of the box.

33. The apparatus of claim 32 wherein said shield members comprise iron sheets.

34. The apparatus of claim 33 wherein said housing further includes an aluminum alloy sheet along the bottom of the box for eddy current shielding.

35. The apparatus of claim 34 wherein the force generating coil is positioned below the magnetic member.

36. The apparatus of claim 2 wherein the circuit means includes a sensor circuit coupled to the sense coil means for monitoring position and velocity of the second magnetic element, a drive circuit coupled to provide a current to the force generating coil, and precision rectifier and low pass filter stages coupled between the sensor circuit and the drive circuit for controlling the current to the force generating coil in accordance with signals from the sensor circuit corresponding to the position and velocity of the second magnetic element.

37. The apparatus of claim 36 further including a damping circuit connected between the low pass filter stage and the drive circuit to damp oscillation of the levitated magnetic member.

38. The apparatus of claim 37 further including a nulling circuit responsive to the magnitude of current in the force generating coil and coupled to the drive circuit to reduce said current to zero in the absence of monitored signals at the input of the sensor circuit.

39. The apparatus of claim 38 further including a fade-out circuit connected in an additional circuit path between the output of the low pass filter and the drive circuit for gradually reducing the current from the drive circuit to zero.

40. The apparatus of claim 39 further including a battery power supply and means for controlling the application of power from the power supply to the circuit means.

41. The apparatus of claim 40 further including a time-out circuit coupled to an output of the fade-out circuit for causing the power controlling means to shut off power to the circuit means after a predetermined period of time without signal inputs to the sensor circuit.

42. The apparatus of claim 41 further including a pair of magnetic reed switches for causing the power controlling means to turn off and on selectively.

43. The apparatus of claim 1 wherein the electromagnetic induction means comprises a plurality of target coils mounted in mutually orthogonal planes, said coils being fixed in position relative to the second magnetic element for movement therewith, and a single stationary sense coil for inductively coupling to the mutually orthogonal coils to sense movement of the magnetic member relative to three orthogonal axes.

44. The apparatus of claim 43 wherein the mutually orthogonal coils are each individually configured in a closed conductive circuit path extending about the second magnetic element, and wherein each coil is individually connected in series with a corresponding tuning capacitor.

45. The apparatus of claim 44 further including a magnetic field shaping member mounted generally concentrically with the sensing coil and aligned therewith along a generally co-planar configuration adjacent said space.

46. The apparatus of claim 45 wherein said magnetic field shaping member comprises a conducting metal plate.

47. The apparatus of claim 1 wherein the electromagnetic field generating means further includes a second force generating coil mounted coaxially and generally co-planar with the sense means beneath the levitated magnetic member, and wherein the circuit means includes a first power circuit coupled to the one force generating coil for controlling a current therein, a second power circuit coupled to the second force generating coil for controlling a current therein, and circuitry for controlling the first and second power circuits in accordance with signals received from the sense coil means.

48. The apparatus of claim 47 wherein the circuit means includes a sensor circuit coupled to the sense coil means, and a precision rectifier and a low pass filter connected in series to the output of the sensor circuit, the output of the low pass filter being connected to the first circuit and, through a damping circuit, to the second power circuit.

49. The apparatus of claim 48 further including a nulling circuit providing a feedback path between an output and an input of the first power circuit for minimizing the current to the first positioning coil when the magnetic member is in a null position.

50. The apparatus of claim 3 wherein the force generating coil is mounted concentrically of the sensing coil means and generally in a common plane therewith beneath the magnetic member and further including a power circuit for establishing a current in said force generating coil.

51. The apparatus of claim 50 further including a magnetic viscous damper mounted in axial alignment along said axis and supporting the force generating coil.

52. The apparatus of claim 50 further including a nulling circuit coupled in a feedback path between an output and an input of the power circuit for minimizing the current in the force generating coil when the magnetic member is in a null position.

53. The apparatus of claim 52 wherein the circuit means comprises a sensor circuit coupled to the sense coil means, and a precision rectifier and a low pass filter coupled in series to the output of the sensor circuit, the low pass filter being connected to provide signals to the power circuit.

54. The apparatus of claim 53 further including a damping circuit connected in an alternative path between the low pass filter and an additional input of the power circuit.

55. The apparatus of claim 54 further including a fade-out circuit coupled between the output of the low pass filter and the power circuit.

56. The apparatus of claim 1 wherein the one force generating coil is mounted concentrically with the first magnetic element above the levitated magnetic member and the electromagnetic field generating means includes a second force generating coil mounted concentrically with the sensing coil means beneath the magnetic member, and wherein the circuit means includes a first power circuit coupled to establish a current in the one force generating coil, a second power circuit coupled to establish a current in the second force generating coil, and first and second damping circuits respectively coupled to inputs of the first and second power circuits for damping the signals applied thereto.

57. The apparatus of claim 56 wherein the circuit means further includes a sensor circuit coupled to receive signals from the sense coil means corresponding to position and velocity of the second magnetic element, and a precision rectifier and a low pass filter coupled in series between the output of the sensor circuit and the first and second damping circuits.

58. The apparatus of claim 57 wherein the circuit means further includes a nulling circuit connected in a feedback path between an output and an input of the first power circuit for minimizing the current in the first force generating coil when the second magnetic element is in a null position.

59. The apparatus of claim 58 further including a fade-out circuit connected between the output of the low pass filter and the first and second power circuits for developing a signal diminishing to zero over a predetermined interval of time in the absence of signals from the sensing coil.

60. The apparatus of claim 7 wherein the sensor circuit includes means for adjusting the amplitude of an oscillating current in the sense coil means.

61. The apparatus of claim 7 wherein the sense coil means comprises four quadrature windings located at 90° intervals about said axis, said quadrature windings being connected together by opposed pairs in figure 8 coil configurations, and an excitation coil inductively coupled to said windings.

62. The apparatus of claim 61 wherein each figure 8 configuration is individually coupled to a corresponding drive circuit for developing signals indicative of translation of the magnetic member in the direction of orientation of the figure 8 configuration.

63. The apparatus of claim 61 wherein each individual quadrature winding is coupled in a corresponding tuned tank circuit connected to the circuit means for developing sense signals indicative of the position and velocity of the magnetic member relative to the individual windings, the circuit means including means for combining said signals to drive the field generating means to restore the magnetic member to the null position.

64. The apparatus of claim 1 wherein the sense coil means comprise a plurality of windings arranged in a sense coil array for sensing both axial and radial displacement of the magnetic member from the null position, and wherein the circuit means includes means for combining individual signals from the respective windings to control the electromagnetic force generating means to oppose any detected displacement of the magnetic member from the null position.

65. The apparatus of claim 64 wherein the electromagnetic field generating means comprise a plurality of force generating coils mounted in a force coil array and coupled to receive the combined signals and develop corresponding magnetic field forces to restore the magnetic member to the null position.

66. The apparatus of claim 64 wherein the sense coil means comprise four quadrature windings in a generally planar array beneath the levitated magnetic member, each of said windings being displaced by 90° from the adjacent windings, wherein the electromagnetic field generating means comprise a plurality of force generating coils in a generally planar array aligned adjacent to the sense coil means array, the force generating coils comprising quadrature windings generally corresponding in orientation to the sense coil windings, and wherein the circuit means comprise means for applying signal components from the individual sense coil windings to corresponding force coil windings to cause the force coil windings to develop a magnetic field opposing the displacement sensed by the sense coil wingings.

67. The apparatus of claim 66 wherein said circuit means includes a plurality of tank circuits individually including the respective sense coil windings and means for causing the tank circuits to oscillate at like frequency and phase.

68. The apparatus of claim 67 wherein the target coil means comprises a tuned circuit which is tuned to oscillate at the same frequency as said tank circuits.

69. The apparatus of claim 67 further including a plurality of high pass filters individually coupled in circuit with a corresponding tank circuit and combined with a phase lag component to pass sensing signals without phase shift at the frequency of the tank circuit oscillations while attenuating low frequency signals which may be superimposed on the sensing coil signals.

70. The apparatus of claim 69 further including a precision rectifier circuit coupled to the output of the high pass filter for cancelling any remaining superimposed signals which are not at the frequency of the sense coil oscillations.

71. The apparatus of claim 64 wherein the windings of the sense coil array comprise four semicircular windings, oriented by opposed pairs with 90° displacement, each individual winding being coupled to a corresponding individual tank circuit of said circuit means and driven to oscillate at like frequency and phase with the other winding tank circuits.

72. The apparatus of claim 71 wherein the currents in the individual windings are directed with respect to each other so that the fields induced thereby cancel each other within the array and reinforce each other about the periphery of the array.

73. The apparatus of claim 65 wherein the sense coil array comprises four quadrature windings intercoupled in series by opposed pairs to form two figure 8 windings displaced by 90° relative to each other and an excitation winding positioned circumferentially relative to the quadrature windings, one of the figure 8 configurations providing sensing signals related to axial movement of the magnetic member along a first axis aligned with the figure 8 configuration, the other figure 8 configuration providing sensing signals indicative of movement of the magnetic member along a coplanar axis orthogonal to the first axis, and circuit means for driving the excitation winding to induce oscillations in the figure 8 windings and in the target coil means to provide sense signals in the figure 8 windings indicative of transverse movement of the magnetic member and sense signals in the excitation winding indicative of axial movement of the magnetic member.

74. The apparatus of claim 73 further including signal processing circuitry coupled to the excitation winding and the figure 8 windings, respectively, to develop drive currents for application to the force coils to forces for restoring the magnetic member to the null position.

75. The apparatus of claim 1 further including an auxiliary magnetic element mounted to support the object to be levitated, the first magnetic element being mounted above the magnetic member and the auxiliary magnetic element being mounted beneath the magnetic member.

76. The apparatus of claim 75 wherein the auxiliary magnetic element is a ring magnet magnet and the first magnetic element is a rod magnet.

77. The apparatus of claim 1 wherein the first magnetic element is mounted beneath the magnetic member to support the second magnetic element in a magnetic levitation system of the repulsion type.

78. The apparatus of claim 77 wherein the first magnetic element comprises a ring magnet mounted concentrically along a central axis of the second magnetic element when the magnetic member is levitated at said null position, and wherein the second magnetic element also comprises a ring magnet polarized to oppose the polarization of the first magnetic element.

79. The apparatus of claim 78 wherein the magnetic member includes a third magnetic element in the form of a plug magnet mounted within the ring magnet of the second magnetic element and coaxial therewith.

80. The apparatus of claim 79 wherein the plug magnet is polarized in the opposite direction to the second magnetic element.

81. The apparatus of claim 79 wherein the sense coil means comprises a plurality of sense coils in a generally planar array between the first magnetic element and the magnetic member, wherein the electric field generating means includes a plurality of force coils in a generally planar array between the first magnetic element and the magnetic member, and wherein the circuit means comprises means for coupling signals from the individual sense coils to develop corresponding fields in individual force coils to restore the magnetic member to the null position.

82. The apparatus of claim 81 wherein the circuit means includes means for causing the individual sense coils to oscillate at a common frequency and in phase with each other.

83. The apparatus of claim 82 wherein the target coil means comprises a series resonant circuit tuned to approximately the oscillation frequency of the sense coils.

84. Magnetic levitating apparatus comprising:
   at least one supporting member for establishing a magnetic field;
   a member to be supported by the magnetic field in a null position, the supporting member and the supported member being generally aligned along a common axis;
   each of said members including a magnetic element, at least one of which is a permanent magnet;
   electromagnetic induction means including a target coil on the supported member for developing signals corresponding to both axial displacement of the supported member from the null position and transverse displacement thereof relative to said axis; and
   means responsive to said signals for modifying the magnetic field until the supported member is restored to axial alignment in the null position.

85. The apparatus of claim 84 wherein the target coil is a closed resonant circuit mounted on the supported member in a generally planar configuration substantially orthogonal to said axis and centered thereon and further including a stationary sense coil mounted to induce oscillations in the closed circuit coil and respond to movement of the target coil with the supported member.

86. The apparatus of claim 85 further including an oscillator circuit coupled to drive the sense coil, said circuit including means for sensing variations in reflected impedance resulting from movement of the target coil.

87. The apparatus of claim 84 wherein both the supporting member and the supported member include permanent magnets, and wherein the supporting member further includes an electromagnetic field generating coil coupled to the sensing means for establishing a net magnetic field biasing the supported member toward the position of axial alignment in the null position.

88. The method of magnetically levitating a magnetic member comprising the steps of:
   establishing a magnetic field between a stationary magnetic element and a magnetic element which is movable with the magnetic member;
   connecting a target coil in a series resonant circuit and mounting it generally coaxially with the movable magnetic element;
   inducing oscillating current in the target coil from a stationary oscillator coil coupled in a circuit which is resonant to the frequency of the target coil circuit;
   sensing variations in amplitude of the oscillations in the oscillator coil circuit to provide indications of movement of the magnetic element; and
   modifying the levitating magnetic field to counter the indicated movement of the magnetic element.

89. The method of maintaining a magnetically levitated object at a null position in a static magnetic field comprising the steps of:
   using a resonant circuit mounted on a magnetic member to be levitated in said field to affect the amplitude of oscillations in a stationary tank circuit inductively coupled to said resonant circuit;
   developing signals corresponding to variations in the amplitude of oscillations in the stationary tank circuit to selectively vary the magnetic field to restore the magnetic member to the null position.

90. The method of maintaining a magnetically levitated object in a selected null position within an established magnetic field comprising the steps of:
   inductively coupling an oscillating signal at a selected frequency between a stationary coil connected in an oscillator tank circuit and a closed resonant circuit which is movable with the levitated object;
   sensing variations in amplitude of the oscillating signal at the tank circuit resulting from movement of the resonant circuit with the levitated object;
   using said sensed amplitude variations as indications of movement of the levitated object from the null position; and
   selectively modifying the established magnetic field in accordance with said sensed amplitude variations to restore the levitated object to the null position.

91. The method of claim 90 wherein said field modifying step includes modifying the established magnetic field to damp oscillations of the levitated object.

92. The method of claim 90 further including the step of using selected circuitry to discriminate in favor of signal variations at said selected frequency and reject signal variations at other frequencies resulting from the modification of the magnetic field.

* * * * *